US012636772B2

(12) United States Patent
Trui

(10) Patent No.: US 12,636,772 B2
(45) Date of Patent: May 26, 2026

(54) 24-AXIS ORIENTATION MECHANISM

(71) Applicant: Ching-Hsiang Trui, Taichung (TW)

(72) Inventor: Ching-Hsiang Trui, Taichung (TW)

( * ) Notice: Subject to any disclaimer, the term of this patent is extended or adjusted under 35 U.S.C. 154(b) by 0 days.

(21) Appl. No.: 18/897,422

(22) Filed: Sep. 26, 2024

(65) Prior Publication Data

US 2025/0180156 A1     Jun. 5, 2025

(30) Foreign Application Priority Data

Sep. 26, 2023     (TW) ................................. 112136938

(51) Int. Cl.
B25J 9/00          (2006.01)
(52) U.S. Cl.
CPC ................................... *B25J 9/0048* (2013.01)

(58) Field of Classification Search
CPC ...................................................... B25J 9/0048
See application file for complete search history.

(56) References Cited

U.S. PATENT DOCUMENTS

2022/0134538 A1* 5/2022 Trui ........................ B25J 9/108
                                                                    74/490.01

* cited by examiner

*Primary Examiner* — Joseph Brown
(74) *Attorney, Agent, or Firm* — Maier & Maier, PLLC

(57)          ABSTRACT

This disclosure mechanism geometrically constituted by twenty-four concentric axes is manipulated for spherical coordinate kinematics. The mechanism includes a U-frame set, a V-frame set, eight U-arc-link sets, eight V-arc-link sets, and eight transmit sets.

5 Claims, 30 Drawing Sheets

Section X-X

Section Y-Y

Section X-X

Section Y-Y

Section X-X

Section Y-Y

Section X-X

Section Y-Y

24-AXIS ORIENTATION MECHANISM

FIELD

Two novel applications are filed on the same filing date, Sep. 26, 2024. To simply distinguish these twin applications is the number of concentric axes.

File U.S. patent application Ser. No. 18/897,422, "24-AXIS ORIENTATION MECHANISM"

File U.S. patent application Ser. No. 18/897,432, "18-AXIS ORIENTATION MECHANISM"

The difference between the twin applications is only the number of sub-sets. This applicaiton Ser. No. 18/897,422, a mechanism behaves twenty-four concentric axes, includes a U-frame set, a V-frame set, eight U-arc-link sets, eight V-arc-link sets, and eight transmit sets. The other application Ser. No. 18/897,432, a mechanism behaves eighteen concentric axes, includes a U-frame set, a V-frame set, six U-arc-link sets, six V-arc-link sets, and six transmit sets.

BACKGROUND

This disclosure mechanism inherited the similar concentric geometry from our three certified patents. The first certified patent (U.S. Pat. No. 8,579,714B2), the second certified patents (U.S. Pat. No. 9,579,786B2, EP2863102, CN104511904A, JP2014-196071) and the third certified patents (U.S. Pat. No. 9,851,045B2, EP3196532, CN107030682A, JP2017-005465).

The significant difference compared with the third certified patents, new subsystems and features are emphasized: transmit sets which include convey belts, pulleys, idlers, and gears. Via these transmit components, these arc-links are synchronously and concentrically rotated along specified geometric orbits by drive modules to provide necessary torque.

SUMMARY

This disclosure mechanism geometrically constituted by twenty-four concentric axes is manipulated for spherical coordinate kinematics. The mechanism includes a U-frame set, a V-frame set, eight U-arc-link sets, eight V-arc-link sets, and eight transmit sets.

Figures 1A, 1B:
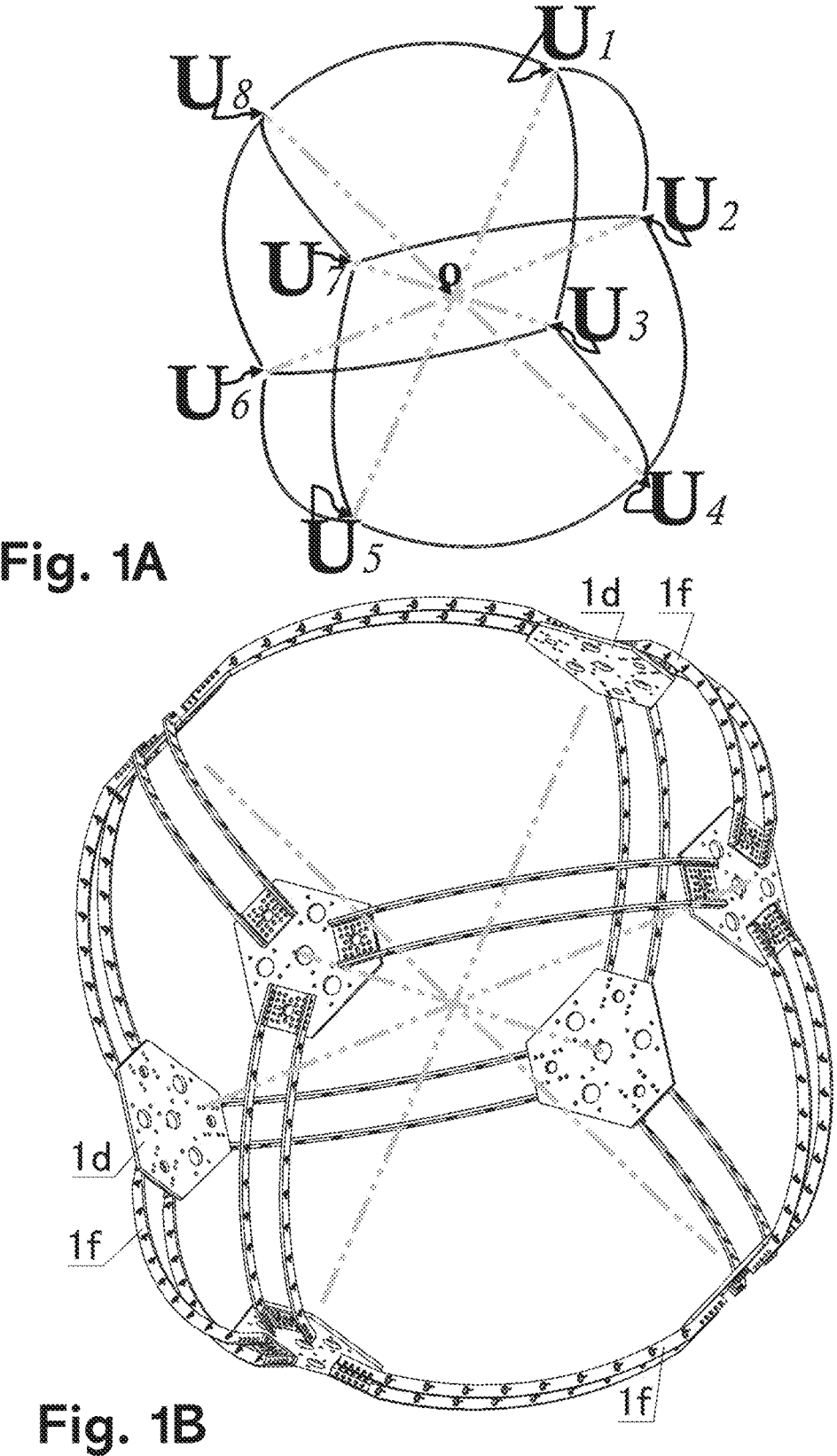
FIG. 1A: unit vectors and angles geometrical definition of U-frame set
FIG. 1B: perspective drawing of U-frame set for frame type I

U-vectoring Config. of this disclosure mechanism:

U-frame set: a U-frame 1f, a U-plate 1d;

V-frame set: a V-frame 2f, a V-plate 2d;

U-arc-link set: at least one U-drive-gear pair 1g, at least one U-drive-module 1m, a U-slave-gear pair 1h, a U-axle pair 1a, a U-arc-link 1c;

V-arc-link set: a V-axle pair 2a, a V-arc-link 2c, a W-axle pair 3a, a W-rotate-module 3n;

transmit set: at least one W-drive-gear pair 3g, at least one W-drive-module 3m, a W-slave-gear pair 3h, a W-drive-pulley 3p, a W-slave-pulley 3q, a W-convey-belt 3b, at least one pair of W-idlers 3z.

V-vectoring Config. of this disclosure mechanism:

V-frame set: a V-frame 2f, a V-plate 2d;

U-frame set: a U-frame 1f, a U-plate 1d;

V-arc-link set: at least one V-drive-gear set 2g, at least one V-drive-module 2m, a V-slave-gear pair 2h, a V-axle pair 2a, a V-arc-link 2c;

U-arc-link set: a U-axle pair 1a, a U-arc-link 1c, a W-axle pair 3a, a W-rotate-module 3n;

transmit set: at least one W-drive-gear pair 3g, at least one W-drive-module 3m, a W-slave-gear pair 3h, a W-drive-pulley 3p, a W-slave-pulley 3q, a W-convey-belt 3b, at least one pair of W-idlers 3z.

DETAILED DESCRIPTION

This disclosure mechanism geometrically constituted by twenty-four concentric axes is manipulated for spherical coordinate kinematics. A critical issue is how to make a concentric mechanism operate smoothly without mutual interference and/or singularity while contemplating practical design and regulating geometric limitation.

Therefore, two configurations are classified for this disclosure, U-vectoring Config. and V-vectoring Config.

U-vectoring Config. of this disclosure mechanism includes a U-frame set, a V-frame set, eight U-arc-link sets, eight V-arc-link sets, and eight transmit sets.

V-vectoring Config. of this disclosure mechanism includes a V-frame set, a U-frame set, eight V-arc-link sets, eight U-arc-link sets, and eight transmit sets.

Both U-vectoring Config. and V-vectoring Config. include a U-frame set in same designation and specification.

Figures 1C, 1D:
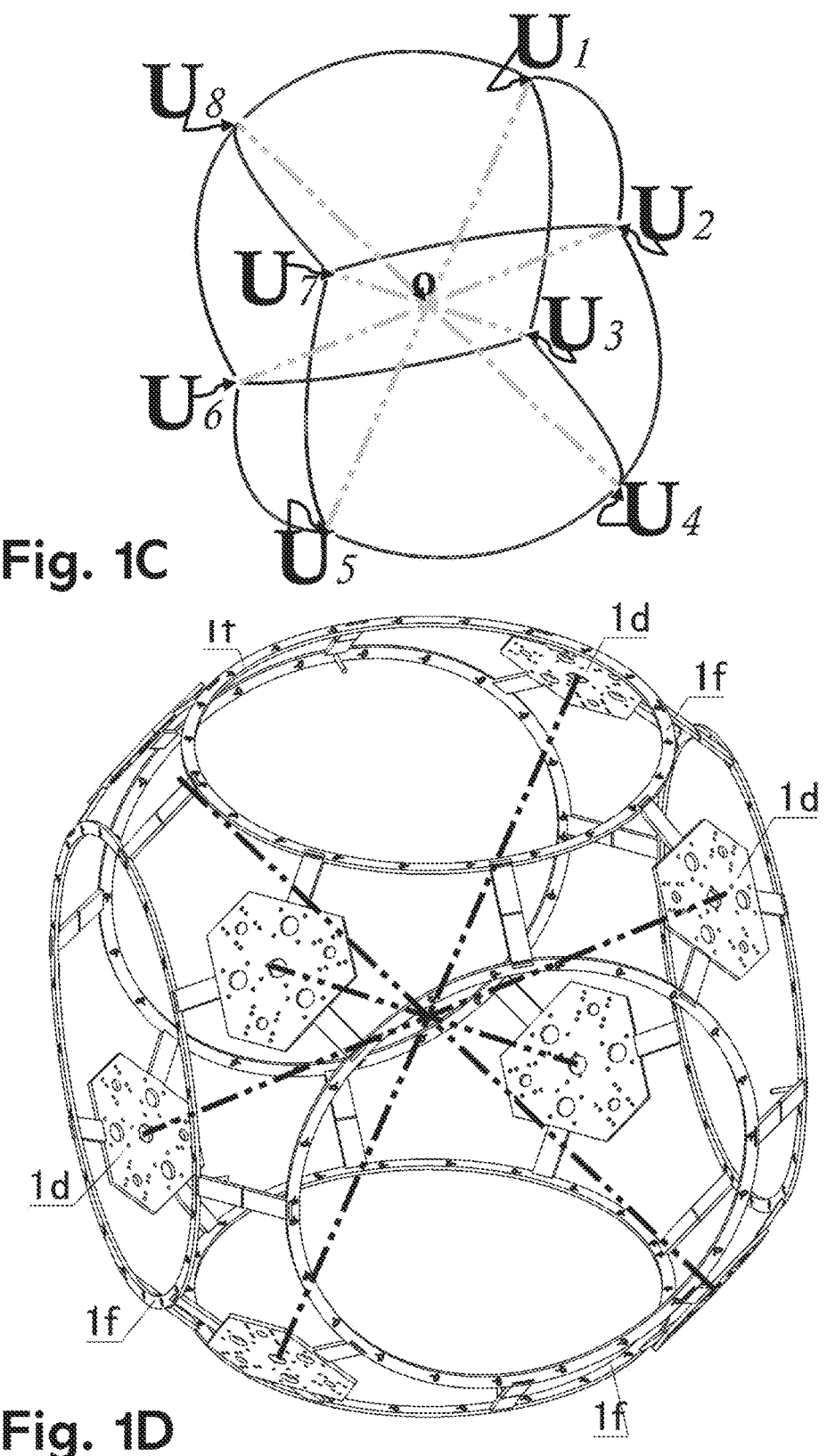
FIG. 1C: unit vectors and angles geometrical definition of U-frame set
FIG. 1D: perspective drawing of U-frame set for frame type II
Figures 1E, 1F:
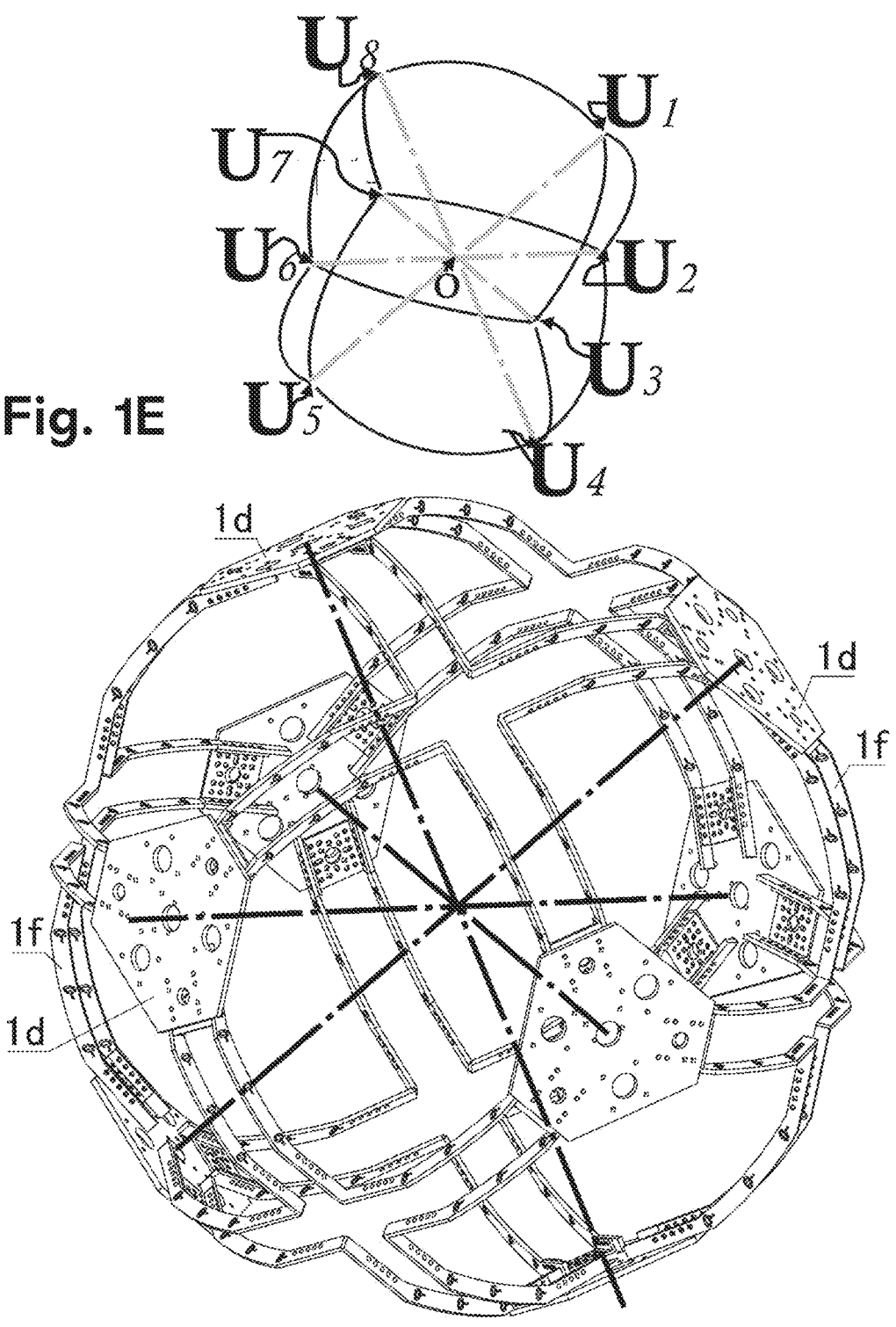
FIG. 1E: unit vectors and angles geometrical definition of U-frame set
FIG. 1F: perspective drawing of U-frame set for frame type III

A U-frame set comprises a U-frame 1f and eight U-plates 1d. The U-frame 1f includes a plurality of brackets. The eight U-plates 1d which are respectively normal onto eight U octahedron faces are mounted with the U-frame 1f to construct the U-frame set. Each U octahedron face is normal onto a U normal vector which is converged at the center of the U-frame 1f. Each normal vector of U-plate 1d converges at the center of U-frame 1f, geometrically represented as unit vectors Ui, wherein i=1~8. Geometrically represented FIG. 1A, FIG. 1C and FIG. 1E. Each angle between any two normal vectors of U-plates 1d is greater than 60° and less than 120°, geometrically represented as 60°<uij<120°, wherein uij=ArcCos (Ui·Uj), i=1~8, j=1~8 and i≠j. The U-frame set can be realized by six different frame types, FIG. 1B shown for frame type I in U-vectoring Config., FIG. 1D shown for frame type II in U-vectoring Config., FIG. 1F shown for frame type III in U-vectoring Config.

Both U-vectoring Config. and V-vectoring Config. include a V-frame set in same designation and specification.

Figures 2A, 2B:
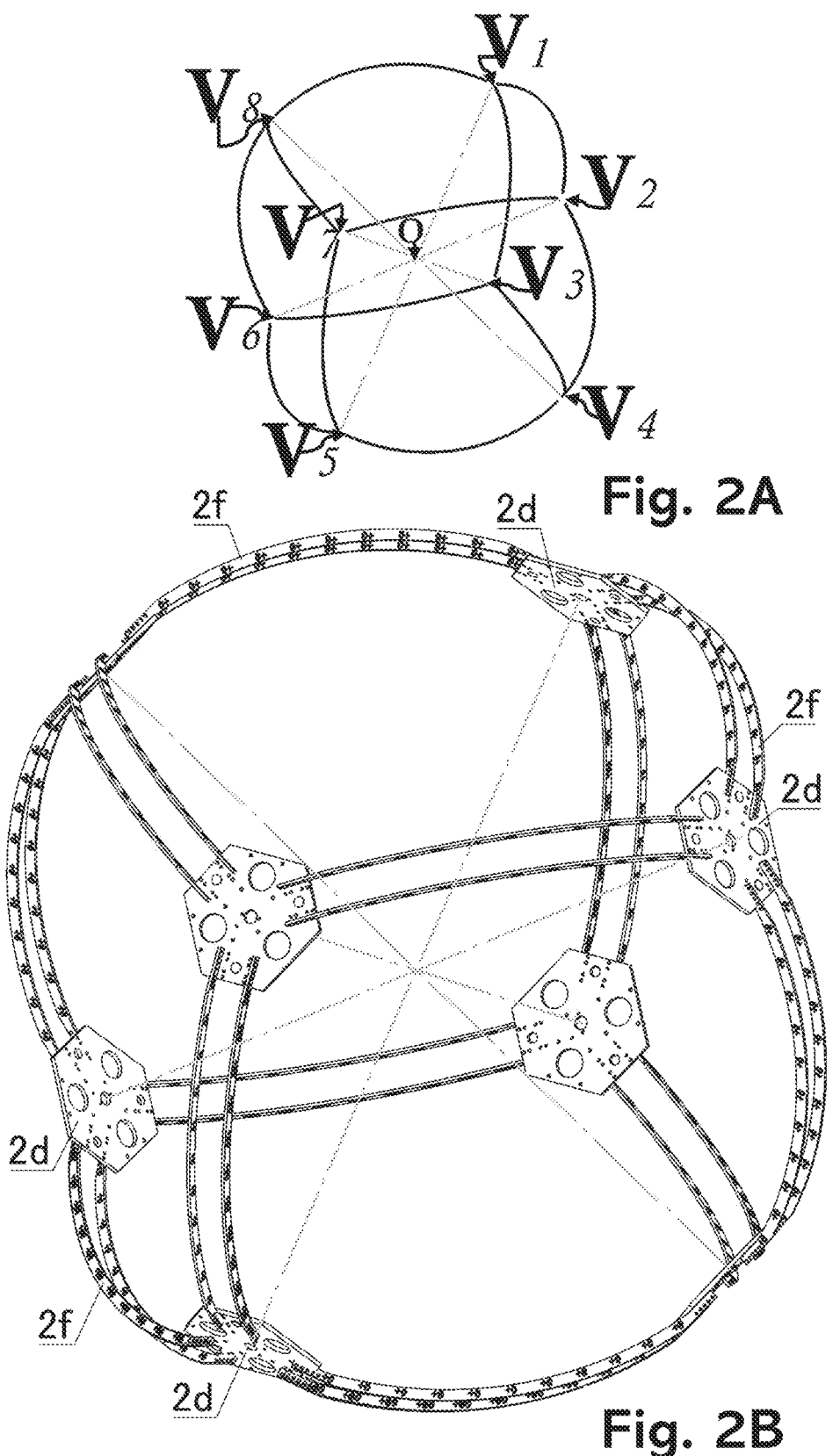
FIG. 2A: unit vectors and angles geometrical definition of V-frame set
FIG. 2B: perspective drawing of V-frame set for frame type IV
Figures 2C, 2D:
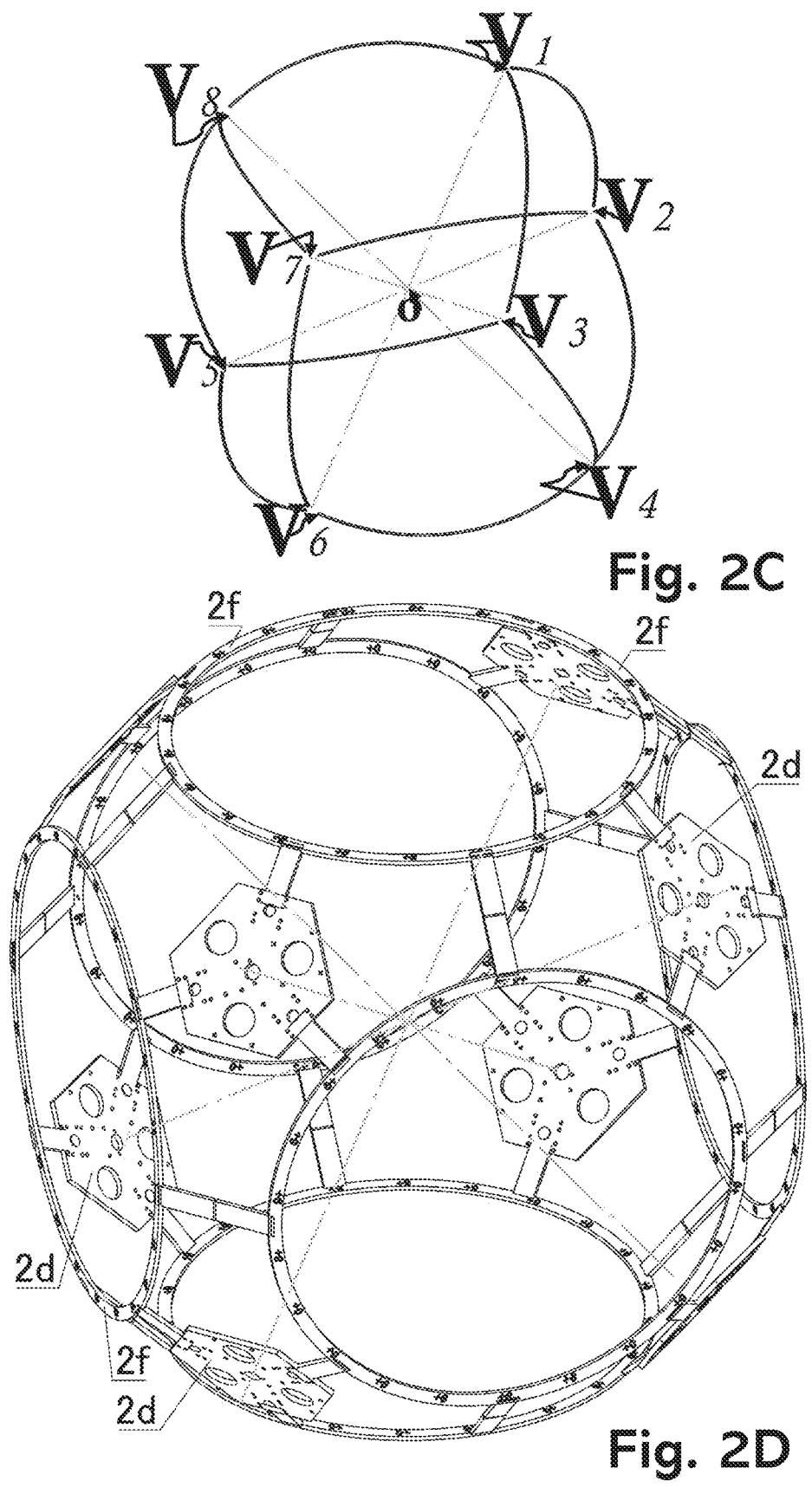
FIG. 2C: unit vectors and angles geometrical definition of V-frame set
FIG. 2D: perspective drawing of V-frame set for frame type V
Figures 2E, 2F:
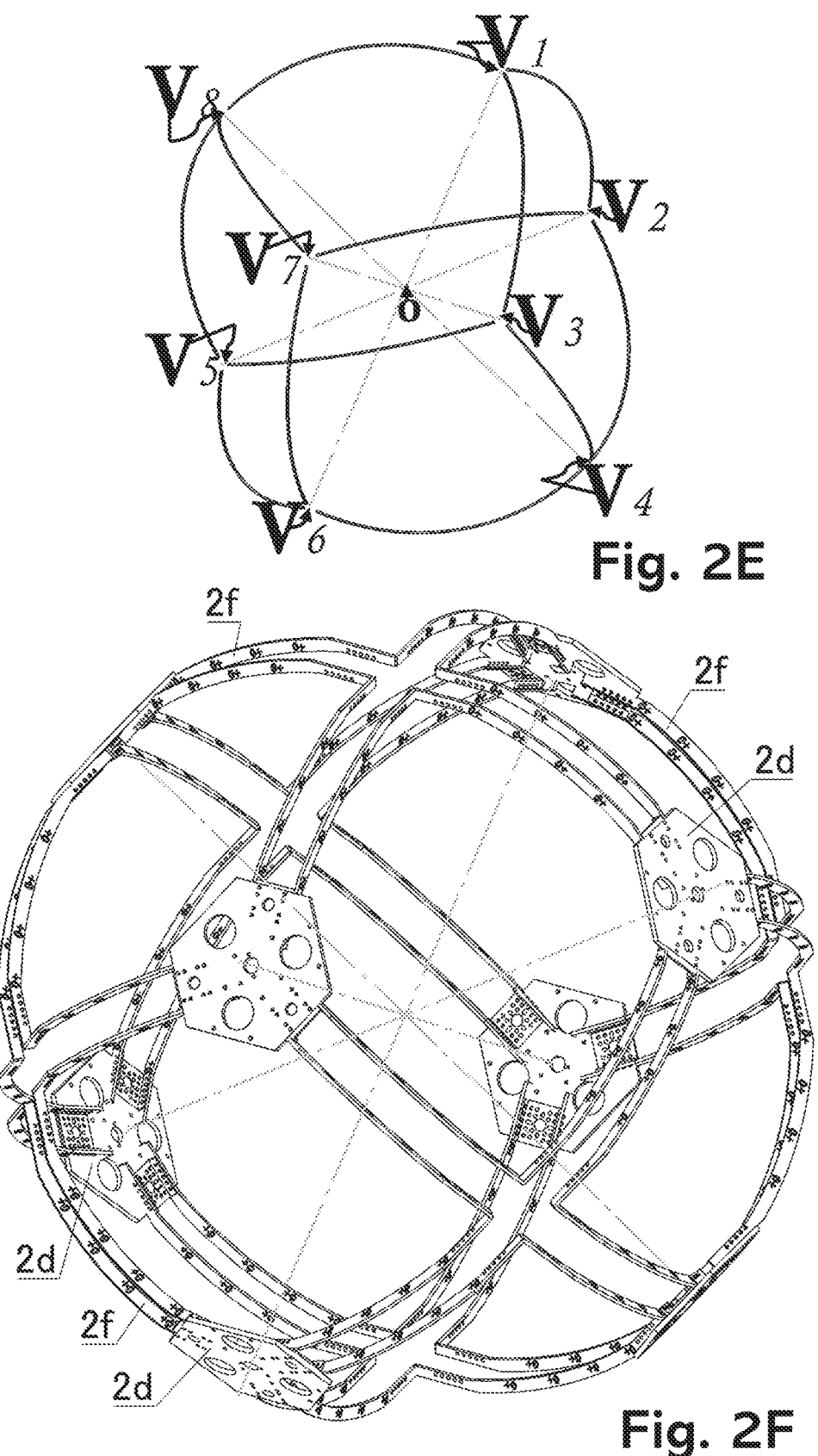
FIG. 2E: unit vectors and angles geometrical definition of V-frame set
FIG. 2F: perspective drawing of V-frame set for frame type VI

A V-frame set comprises a V-frame 2f and eight V-plates 2d. The V-frame 2f includes a plurality of brackets. The eight V-plates 2d which are respectively normal onto eight V octahedron faces are mounted with the V-frame 2f to construct the V-frame set. Each V octahedron face is normal onto a V normal vector which is converged at the center of the V-frame 2f. Each normal vector of V-plates 2d converges at the center of V-frame 2f, geometrically represented as unit vectors Vi, wherein i=1~8. Geometrically represented FIG. 2A, FIG. 2C and FIG. 2E. Each angle between any two normal vectors of V-plates 2d is greater than 60° and less than 120°, geometrically represented as 60°<vij<120°, wherein vij=ArcCos (Vi·Vj), i=1~8, j=1~8 and i≠j. The V-frame set can be designed by six different frame types, FIG. 2B shown for frame type IV in V-vectoring Config., FIG. 2D shown for frame type V in V-vectoring Config., FIG. 2F shown for frame type VI in V-vectoring Config.

The designation and specification of eight U-arc-link sets and eight V-arc-link sets which correspond to U-vectoring Config. are introduced.

Eight U-arc-link sets, each U-arc-link set comprises a U-axle pair 1a, at least one U-drive-gear pair 1g, at least one U-drive-module 1m, a U-slave-gear pair 1h and a U-arc-link 1c.

Each U-axle pair 1a includes a U-bearing and a U-axle. The U-bearing is mounted onto a corresponding U-plate 1d. Both ends of the U-axle are indicated as frame-end and link-end, wherein the U-axle through the U-bearing coincides with U normal vector of the U-plate 1d and points into center of the U-frame set. Each vector of U-axle pair 1a concentrically coincides with a normal vector of U-plates 1d and converges at the center of the U-frame 1f, geometrically represented as unit vectors Ui, wherein i=1~8.

Each U-drive-gear pair 1g includes a U-drive-bearing and a U-drive-gear. The U-drive-bearing is mounted onto the corresponding U-plate 1d. The U-drive-module 1m's shaft through the U-drive-bearing is pivotally fastened onto the U-drive-gear, wherein each U-drive-module 1m can be a motor or a torque output device or an angle sensor or a shaft.

Each U-slave-gear pair 1h includes a U-slave-bearing and a U-slave-gear. According to pre-defined gear ratio, the U-drive-gear and the U-slave-gear are selected to meet design requirements. The U-slave-bearing is mounted onto the U-slave-gear. The U-axle through the U-gear-bearing is pivotally fastened with the U-slave-gear. The U-slave-gear meshed with the U-drive-gear is synchronously rotated by the U-drive-module 1m, wherein distance between both centers of the U-drive-gear and the U-slave-gear is equal to sum of reference radii of the U-drive-gear and the U-slave-gear.

Both ends of the U-arc-link 1c are indicated as frame-end and link-end. The-frame-end of U-arc-link 1c is pivotally fastened onto the U-slave-gear.

Eight V-arc-link sets, each V-arc-link set comprises a W-axle pair 3a, W-rotate-module 3n, a V-axle pair 2a and V-arc-link 2c.

Each V-axle pair 2a includes a V-bearing and a V-axle. The V-bearing is mounted onto a corresponding V-plate 2d. Both ends of the V-axle are indicated as frame-end and link-end, wherein the V-axle through the V-bearing coincides with V normal vector of the V-plate 2d and points into center of the V-frame set. Each vector of V-axle pair 2a concentrically coincides with a normal vector of V-plates 2d and converges at the center of the V-frame 2f, geometrically represented as unit vectors Vi, wherein i=1~8.

Each W-axle pair 3a includes a W-bearing and a W-axle. Both ends of the W-axle are indicated as U-end and V-end. Each vector of W-axle pair 3a converges at the center of the U-frame 1f, geometrically represented as unit vectors Wi, wherein i=1~8. Each arc-length of U-arc-link 1c is defined as an angle between the vector of W-axle pair 3a and the vector of U-axle pair 1a onto the same U-arc-link 1c, geometrically represented as αi=ArcCos (Wi·Ui), wherein i=1~8.

Both ends of the V-arc-link 2c are indicated as frame-end and link-end. The W-bearing is mounted onto the link-end of U-arc-link 1c. The W-axle is directed through the W-bearing. The V-end of W-axle pivotally fastens onto the link-end of V-arc-link 2c. The W-rotate-module 3n's shaft is pivotally fastened onto the U-end of W-axle, wherein each W-rotate-module 3n can be an angle sensor or a shaft. The-frame-end of V-arc-link 2c is pivotally fastened onto the link-end of V-axle. Each arc-length of V-arc-link 2c is defined as an angle between the vector of W-axle pair 3a and the vector of V-axle pair 2a onto the same V-arc-link 2c, geometrically represented as βi=ArcCos (Wi·Vi), wherein i=1~8.

Consequently, the U-arc-link 1c is concentrically rotated along specified geometric orbit between the U-frame set and the V-arc-link 2c. The V-arc-link 2c is concentrically rotated along specified geometric orbit between the V-frame set and the U-arc-link 1c.

The U-frame set is "larger" than any geometric orbit of eight U-arc-link sets for preventing interference. The V-frame set is "smaller" than any geometric orbits of eight V-arc-link sets for preventing interference. Any geometric orbit radius of eight U-arc-link sets is "greater" than any geometric orbit radius of eight V-arc-link sets. Shown as FIG. 3A, FIG. 3B, FIG. 3C, FIG. 3D The designation and specification of eight V-arc-link sets and eight U-arc-link sets which correspond to V-vectoring Config. are introduced.

Eight V-arc-link sets, each V-arc-link set comprises a V-axle pair $2a$, at least one V-drive-gear set $1g$, at least one V-drive-module $2m$, a V-slave-gear pair $2h$ and a V-arc-link $2c$.

Each V-axle pair $2a$ includes a V-bearing and a V-axle. The V-bearing is mounted onto a corresponding V-plate $2d$. Both ends of the V-axle are indicated as frame-end and link-end, wherein the V-axle through the V-bearing coincides with V normal vector of the V-plate $2d$ and points into center of the V-frame set. Each vector of V-axle pair $2a$ concentrically coincides with a normal vector of V-plates $2d$ and converges at the center of the V-frame $2f$, geometrically represented as unit vectors Vi, wherein i=1~8.

Each V-drive-gear pair $2g$ includes a V-drive-bearing and a V-drive-gear. The V-drive-bearing is mounted onto the corresponding V-plate $2d$. The V-drive-module $2m$'s shaft through the V-drive-bearing is pivotally fastened onto the V-drive-gear, wherein each V-drive-module $2m$ can be a motor or a torque output device or an angle sensor or a shaft.

Each V-slave-gear pair $2h$ includes a V-slave-bearing and a V-slave-gear. According to pre-defined gear ratio, the V-drive-gear and the V-slave-gear are selected to meet design requirements. The V-slave-bearing is mounted onto the V-slave-gear. The V-axle through the V-gear-bearing is pivotally fastened with the V-slave-gear. The V-slave-gear meshed with the V-drive-gear is synchronously rotated by the V-drive-module $2m$, wherein distance between both centers of the V-drive-gear and the V-slave-gear is equal to sum of reference radii of the V-drive-gear and the V-slave-gear.

Both ends of the V-arc-link $2c$ are indicated as frame-end and link-end. The-frame-end of V-arc-link $2c$ is pivotally fastened onto the V-slave-gear.

Eight U-arc-link sets, each U-arc-link set comprises a W-axle pair $3a$, a W-rotate-module $3n$, a U-axle pair $1a$ and U-arc-link $1c$.

Each U-axle pair $1a$ includes a U-bearing and a U-axle. The U-bearing is mounted onto a corresponding U-plate $1d$. Both ends of the U-axle are indicated as frame-end and link-end, wherein the U-axle through the U-bearing coincides with U normal vector of the U-plate $1d$ and points into center of the U-frame set. Each vector of U-axle pair $1a$ concentrically coincides with a normal vector of U-plates $1d$ and converges at the center of the U-frame $1f$, geometrically represented as unit vectors Ui, wherein i=1~8.

Each W-axle pair $3a$ includes a W-bearing and a W-axle. Both ends of the W-axle are indicated as V-end and U-end. Each vector of W-axle pair $3a$ converges at the center of the V-frame $2f$, geometrically represented as unit vectors Wi, wherein i=1~8. Each arc-length of V-arc-link $2c$ is defined as an angle between the vector of W-axle pair $3a$ and the vector of V-axle pair $2a$ onto the same V-arc-link $2c$, geometrically represented as $\beta i=ArcCos (Wi \cdot Vi)$, wherein i=1~8.

Both ends of the U-arc-link $1c$ are indicated as frame-end and link-end. The W-bearing is mounted onto the link-end of U-arc-link $1c$. The W-axle is directed through the W-bearing. The U-end of W-axle pivotally fastens onto the link-end of U-arc-link $1c$. The W-rotate-module $3n$'s shaft is pivotally fastened onto the V-end of W-axle, wherein each W-rotate-module $3n$ can be an angle sensor or a shaft. The-frame-end of U-arc-link $1c$ is pivotally fastened onto the link-end of U-axle. Each arc-length of U-arc-link $1c$ is defined as an angle between the vector of W-axle pair $3a$ and the vector of U-axle pair $1a$ onto the same U-arc-link $1c$, geometrically represented as $\alpha i=ArcCos (Wi \cdot Ui)$, wherein i=1~8.

Consequently, the V-arc-link $2c$ is concentrically rotated along specified geometric orbit between the V-frame set and the U-arc-link $1c$. The U-arc-link $1c$ is concentrically rotated along specified geometric orbit between the U-frame set and the V-arc-link $2c$.

The V-frame set is "smaller" than any geometric orbits of eight V-arc-link sets for preventing interference. The U-frame set is "larger" than any geometric orbits of eight U-arc-link sets for preventing interference. Any geometric orbit radius of eight V-arc-link sets is "less" than any geometric orbit radius of eight U-arc-link sets. Shown as FIG. 4A, FIG. 4B, FIG. 4C and FIG. 4D.

The designation and specification of eight transmit sets corresponding to U-vectoring Config. or corresponding to V-vectoring Config. are introduced.

Eight transmit sets, each transmit set comprises at least one W-drive-gear pair $3g$, at least one W-drive-module $3m$, a W-slave-gear pair $3h$ and a conveyor set.

Each W-drive-gear pair $3g$ includes a W-drive-bearing and a W-drive-gear. If the U-vectoring Config., the W-drive-bearing is mounted onto the U-plate $1d$. Else the V-vectoring Config., the W-drive-bearing is mounted onto the V-plate $2d$. A shaft of W-drive-module $3m$ through the W-drive-bearing is pivotally fastened onto the W-drive-gear, wherein each W-drive-module $3m$ can be a motor or a torque output device or an angle sensor or a shaft.

Each W-slave-gear pair $3h$ includes a W-slave-bearing and a W-slave-gear.

If the U-vectoring Config., the W-slave-bearing through the U-axle is mounted onto the W-slave-gear, wherein the W-slave-gear is inserted between the U-slave-gear and the U-plate $1d$. Else the V-vectoring Config., the W-slave-bearing through the V-axle is mounted onto the W-slave-gear, Wherein the W-slave-gear is inserted between the V-slave-gear and the V-plate $2d$.

According to pre-defined gear ratio, the W-drive-gear and the W-slave-gear are selected to meet design requirements. The W-slave-gear meshed with the W-drive-gear is synchronously rotated by the W-drive-module $3m$, wherein distance between both centers of the W-drive-gear and the W-slave-gear is equal to sum of reference radii of the W-drive-gear and the W-slave-gear.

Each conveyor set includes a W-drive-pulley $3p$, a W-slave-pulley $3q$, a W-convey-belt $3b$ and at least one pair of W-idlers $3z$.

If the U-vectoring Config., the W-drive-pulley $3p$ is pivotally fastened onto the link-end of the U-axle. Else the V-vectoring Config., the W-drive-pulley $3p$ is pivotally fastened onto the link-end of the V-axle. Each W-drive-pulley $3p$ can be a timing pulley or a winch pulley or a groove pulley or a sprocket.

If the U-vectoring Config., the W-slave-pulley $3q$ is pivotally fastened onto the V-end of W-axle. Else the V-vectoring Config., the W-slave-pulley $3q$ is pivotally fastened onto the U-end of W-axle. Each W-slave-pulley $3q$ can be a timing pulley or a winch pulley or a groove pulley or a sprocket.

Both sites of the W-convey-belt 3*b* are synchronously meshed and conveyed with the W-drive-pulley 3*p* and the W-slave-pulley 3*q*.

If the U-vectoring Config., each pair of W-idlers 3*z* are respectively installed onto both sides and rolled within the outer flange of the U-arc-link 1*c*. Consequently, the V-arc-link 2*c* is synchronously rotated by the W-slave-pulley 3*q* which torque is transmitted via the W-convey-belt 3*b* by the W-drive-pulley 3*p*. Else the V-vectoring Config., each pair of W-idlers 3*z* are respectively installed onto both sides and rolled within the outer flange of the V-arc-link 2*c*. Consequently, the U-arc-link 1*c* is synchronously rotated by the W-slave-pulley 3*q* which torque is transmitted via the W-convey-belt 3*b* by the W-drive-pulley 3*p*.

Each W-convey-belt 3*b* can be adjusted direction and tension by each pair of W-idlers 3*z*, wherein each W-convey-belt 3*b* can be a timing belt or a round belt or a cable or a chain.

The eight transmit sets corresponding to U-vectoring Config. are shown as FIG. 3A, FIG. 3B, FIG. 3C and FIG. 3D. The eight transmit sets corresponding to V-vectoring Config. are shown as FIG. 4A, FIG. 4B, FIG. 4C and FIG. 4D.

There are four independent claims for this disclosure mechanism.

Two independent claims are defined according to the U-vectoring Config.

Figure 3A:
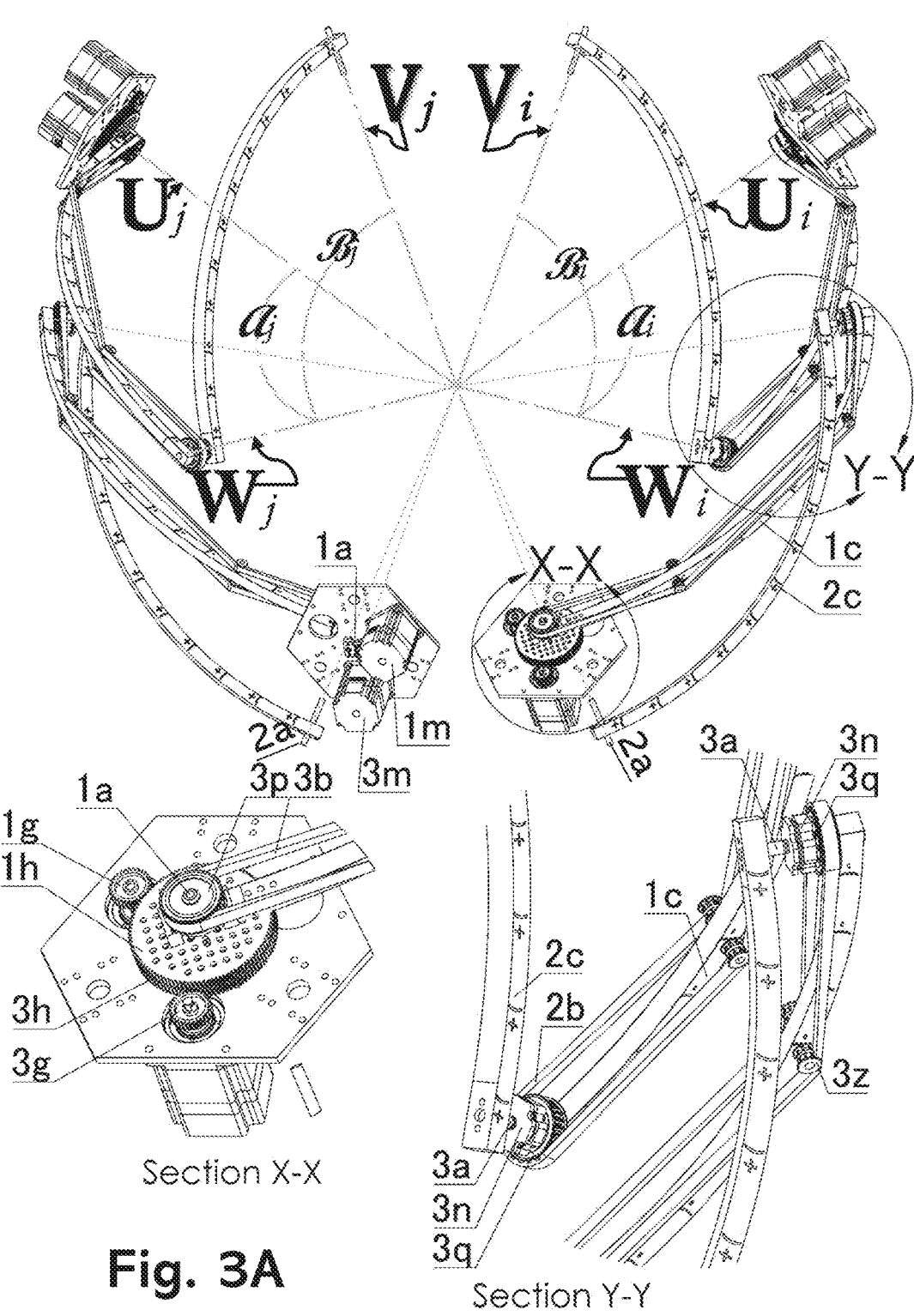
FIG. 3A: drawings for the first independent claim
Figure 3B:
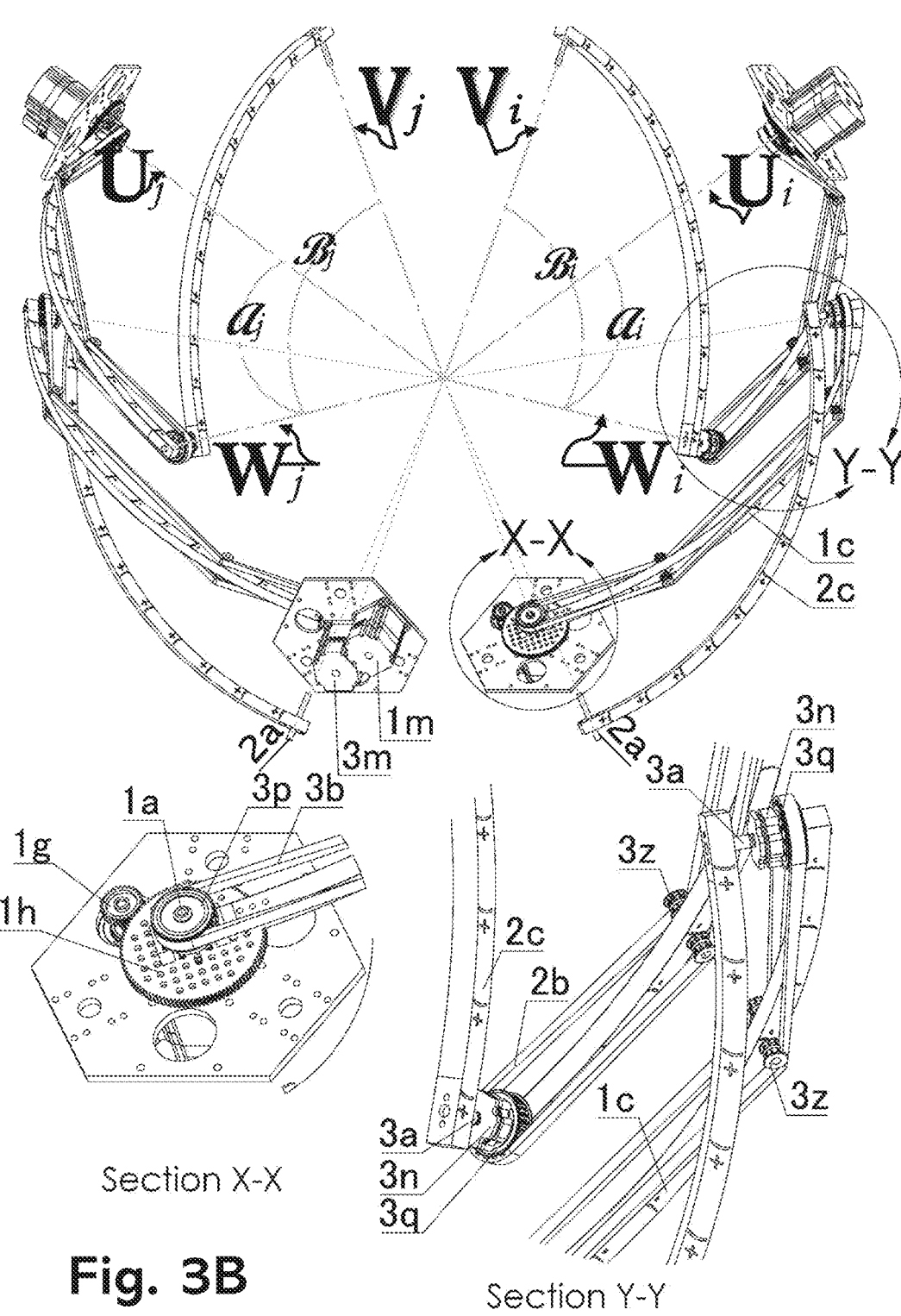
FIG. 3B: drawings for the first independent claim

The first independent claim according to the U-vectoring Config. includes eight transmit sets, shown as FIGS. 3A and 3B.

Figure 3C:
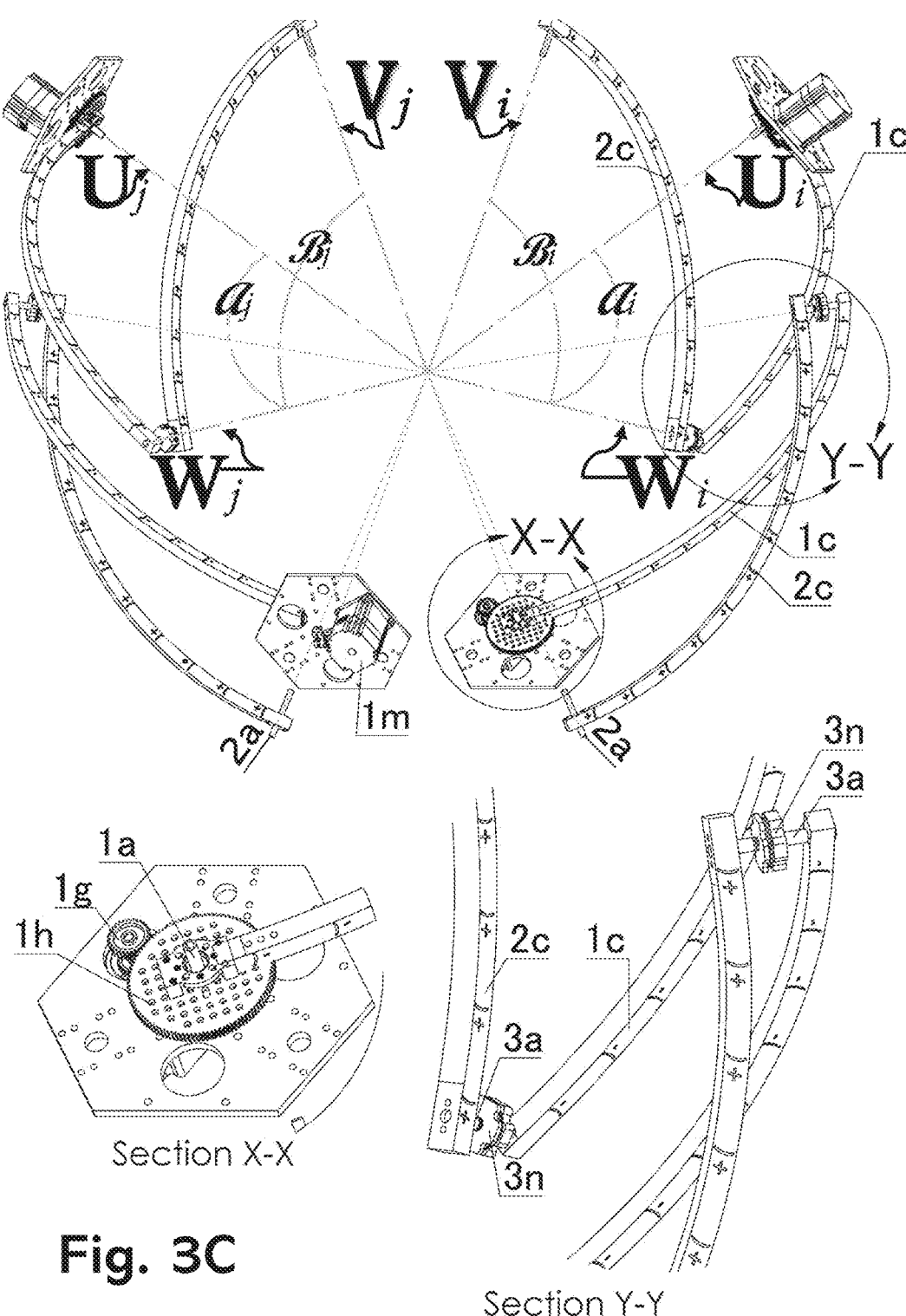
FIG. 3C: drawings for the second independent claim
Figure 3D:
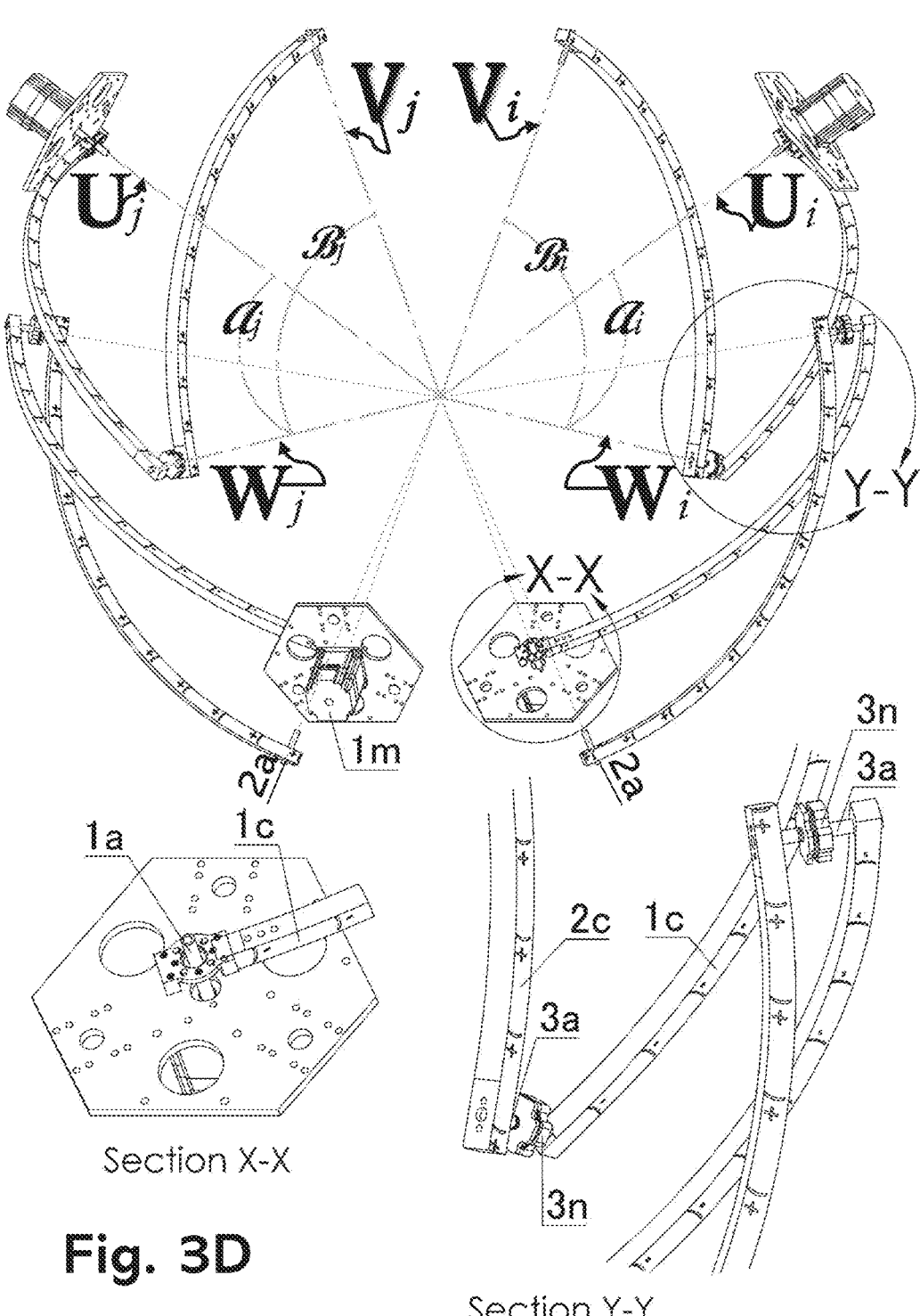
FIG. 3D: drawings for the second independent claim

The second independent claim according to the U-vectoring Config. excludes eight transmit sets. shown as FIGS. 3C and 3D.

Two independent claims are defined according to the V-vectoring Config.

Figure 4A:
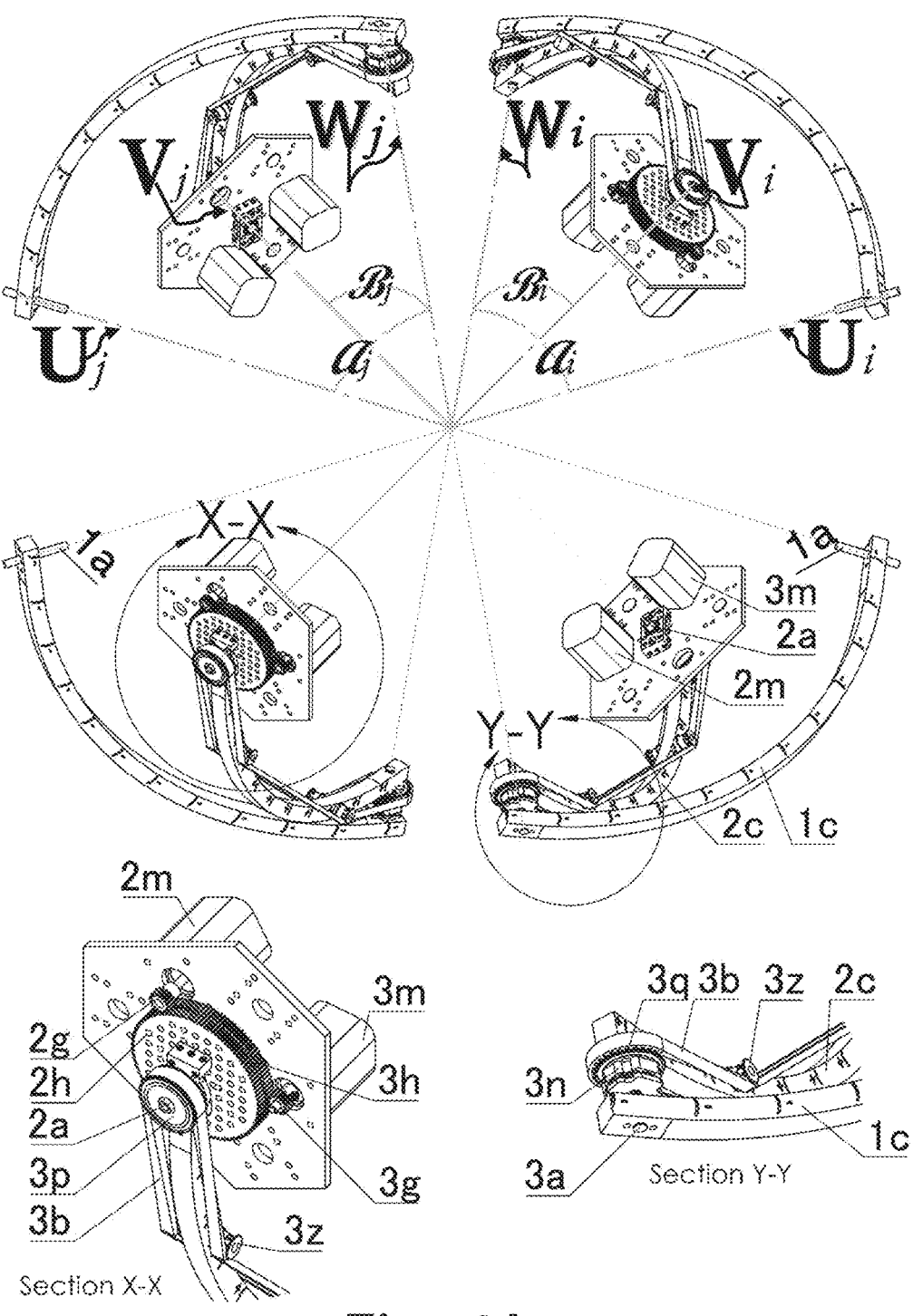
FIG. 4A: drawings for the third independent claim
Figure 4B:
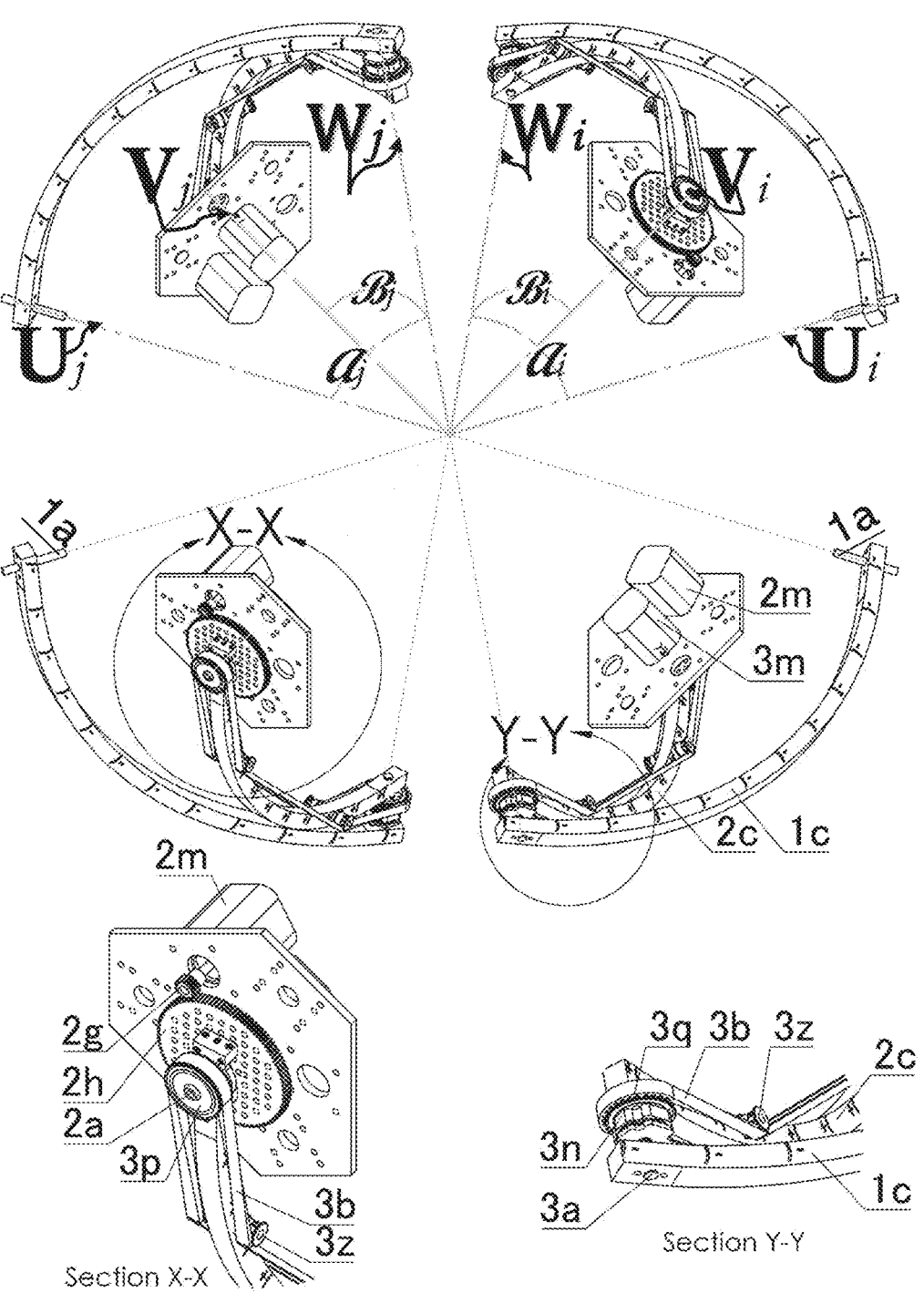
FIG. 4B: drawings for the third independent claim

The third independent claim according to the V-vectoring Config. includes eight transmit sets, shown as FIGS. 4A and 4B.

Figure 4C:
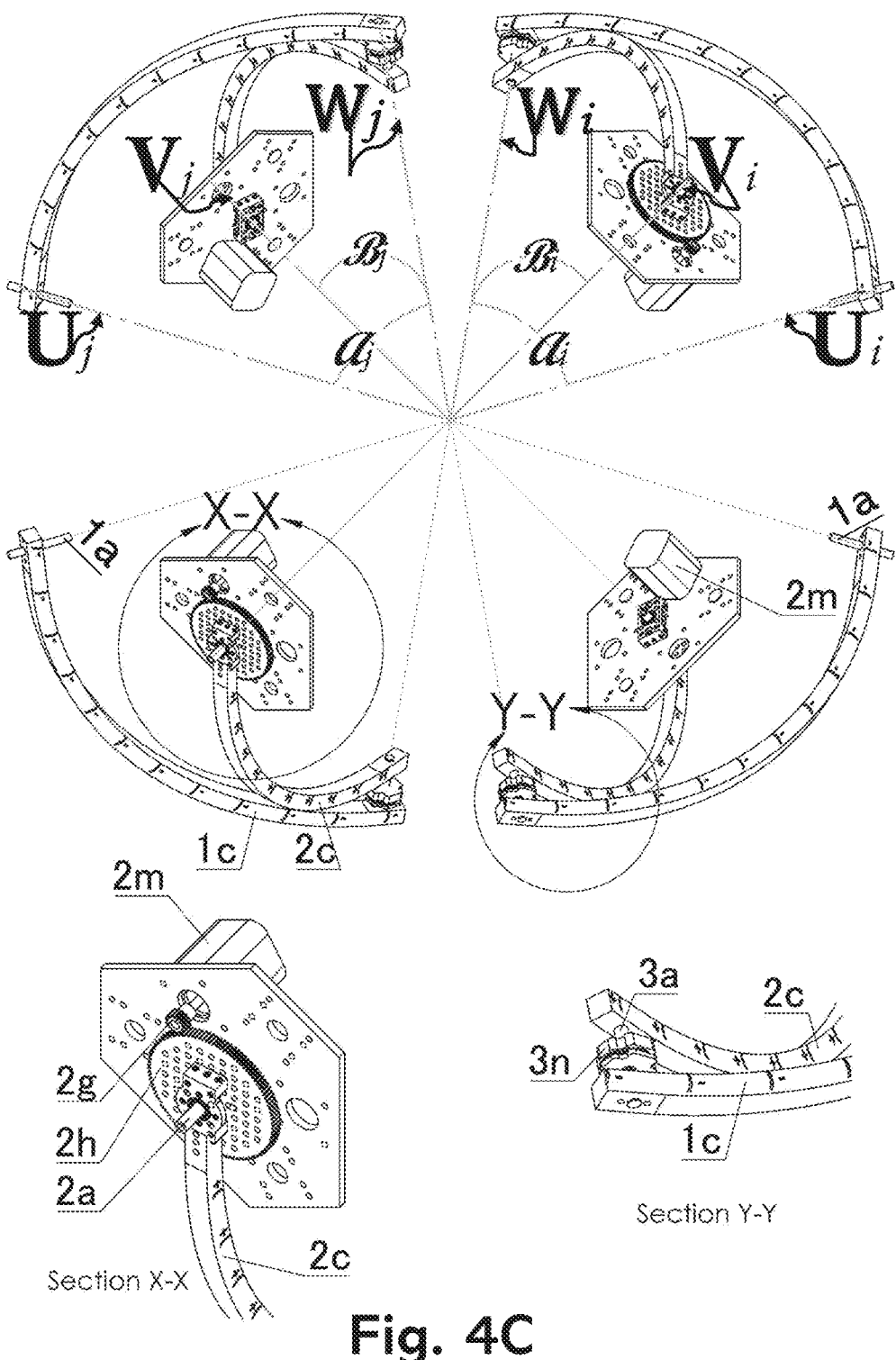
FIG. 4C: drawings for the fourth independent claim
Figure 4D:
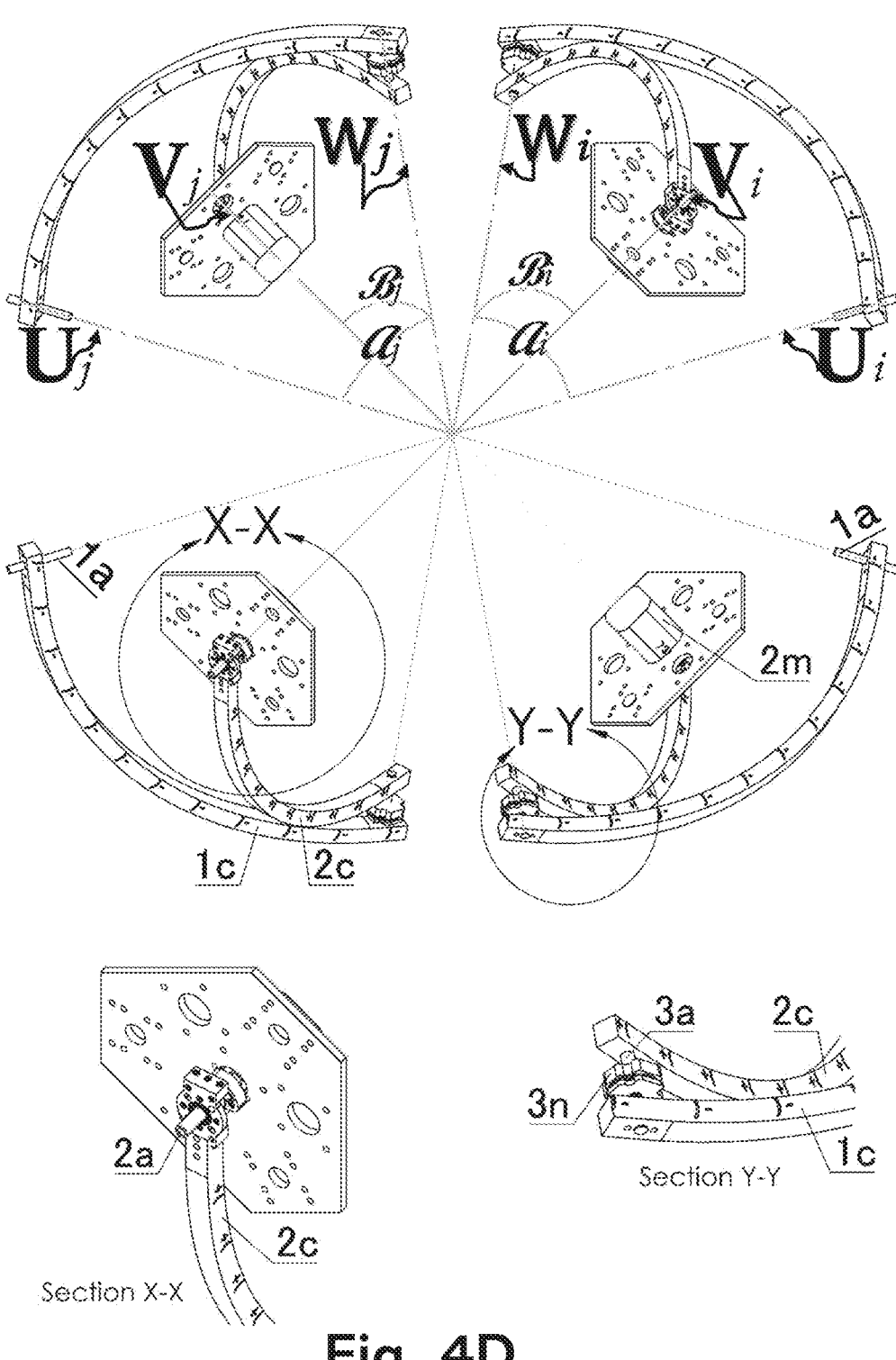
FIG. 4D: drawings for the fourth independent claim
Figure 5A:
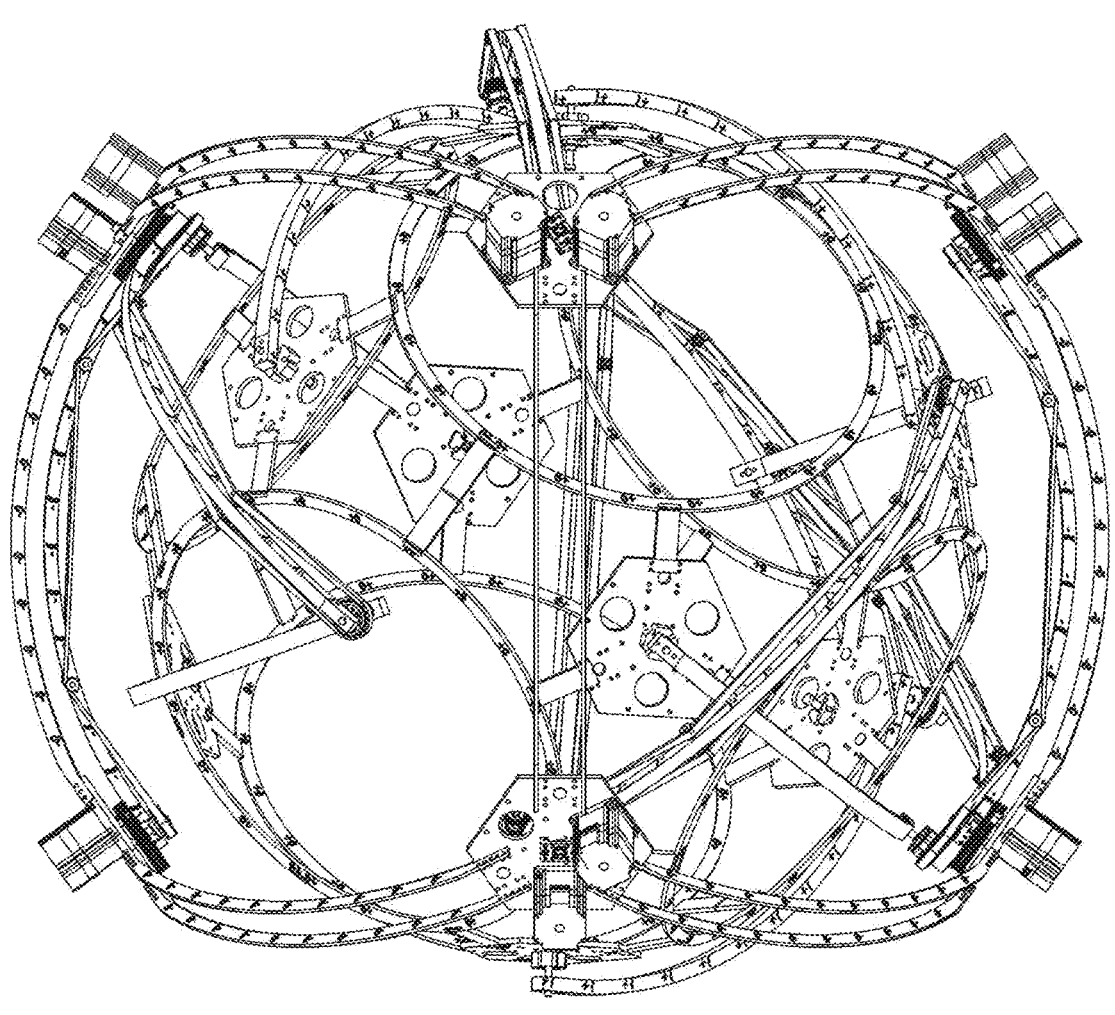
FIG. 5A: Front-view drawing for the 1st embodiment of frame type I and frame type V
Figure 5B:
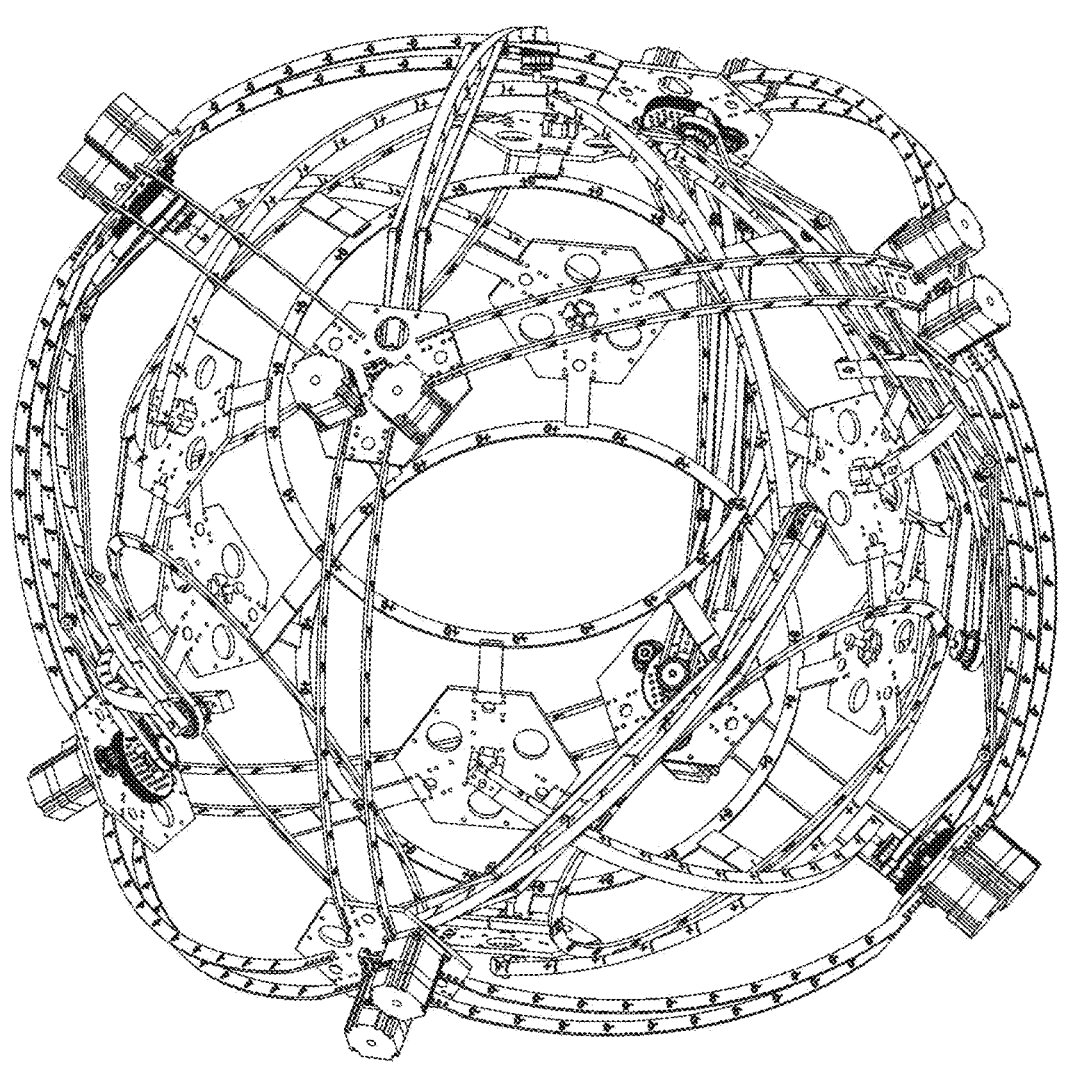
FIG. 5B: 3-view drawing for the 1st embodiment of frame type I and frame type V
Figure 5C:
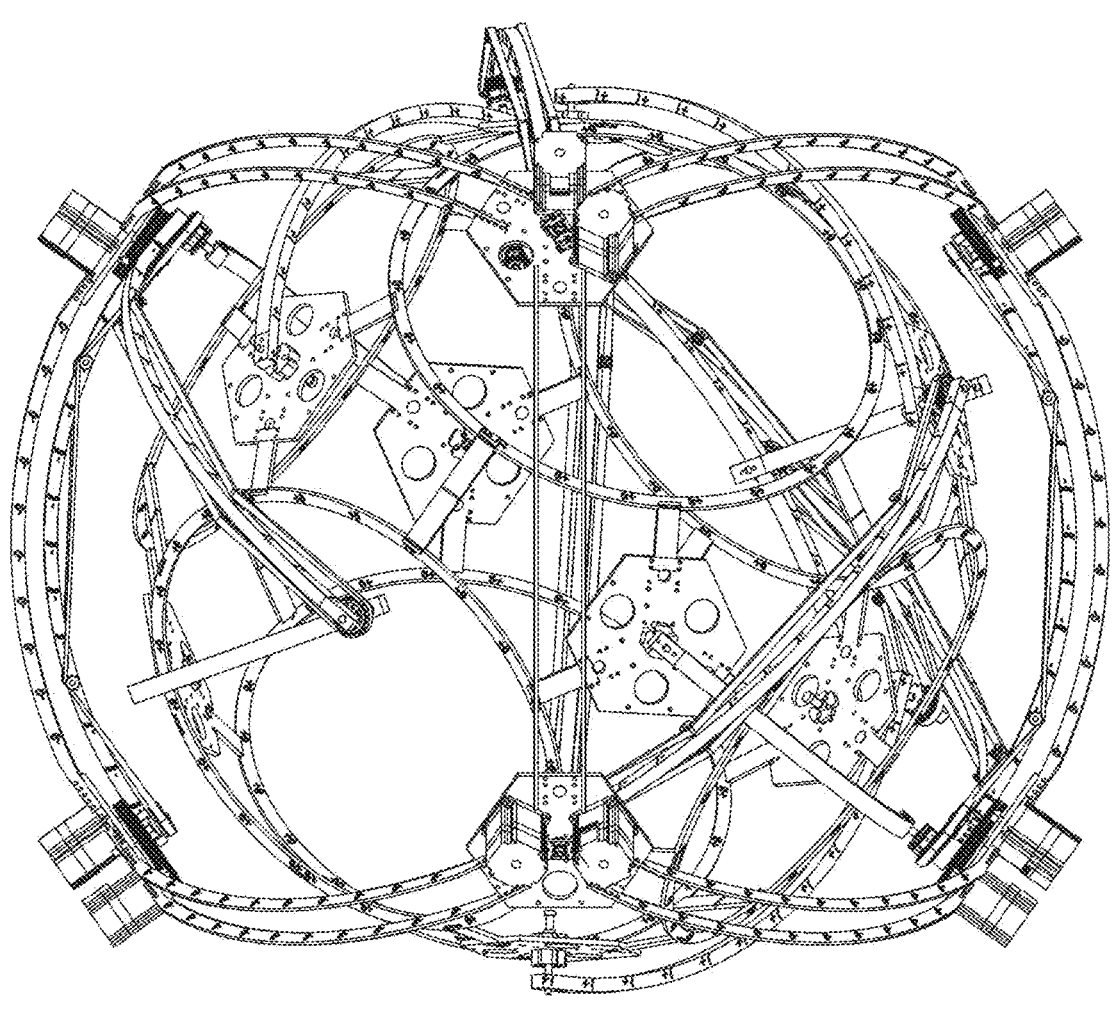
FIG. 5C: Front-view drawing for the 1st embodiment of frame type I and frame type V
Figure 5D:
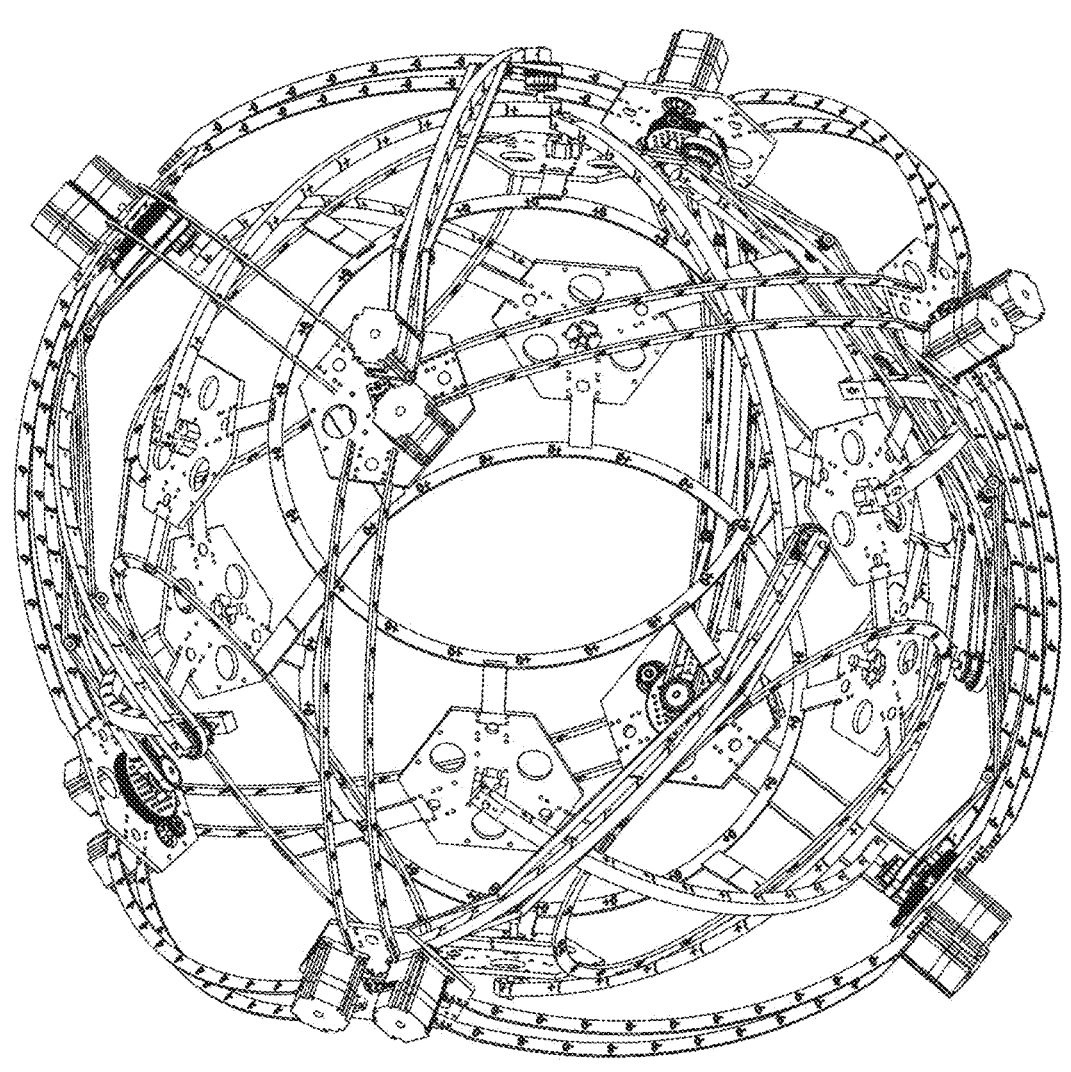
FIG. 5D: 3-view drawing for the 1st embodiment of frame type I and frame type V
Figure 5E:
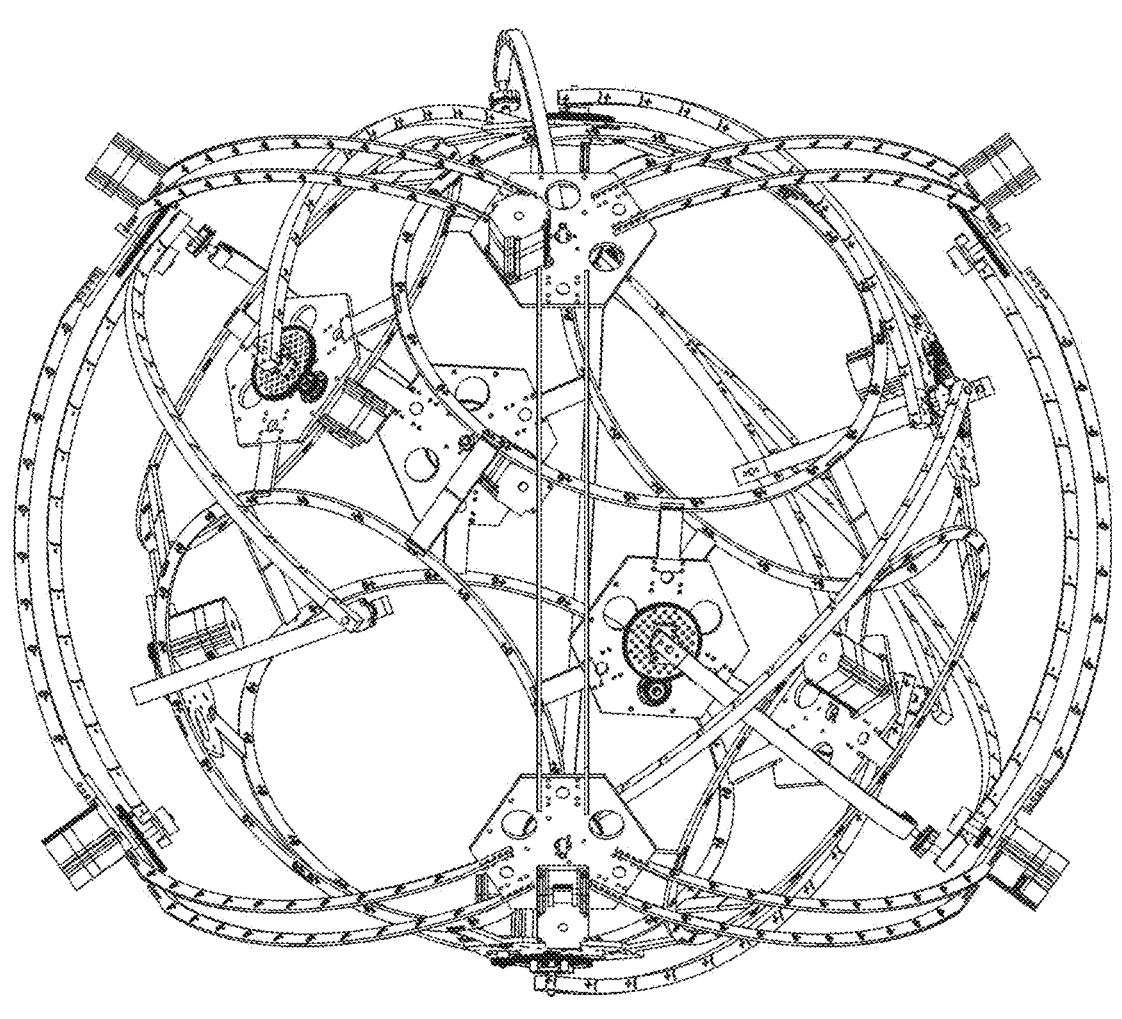
FIG. 5E: Front-view drawing for the 2nd embodiment of frame type I and frame type V
Figure 5F:
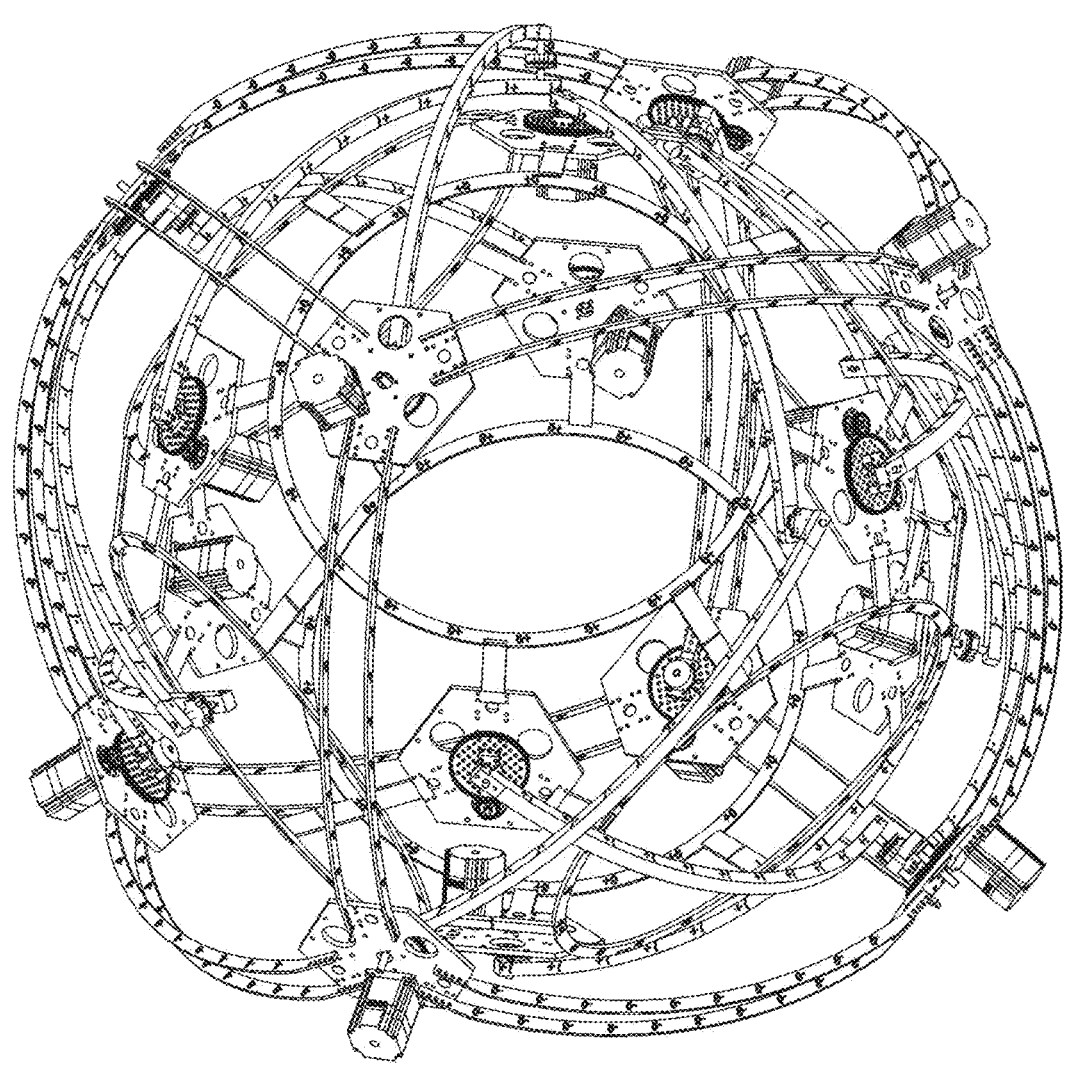
FIG. 5F: 3-view drawing for the 2nd embodiment of frame type I and frame type V
Figure 5G:
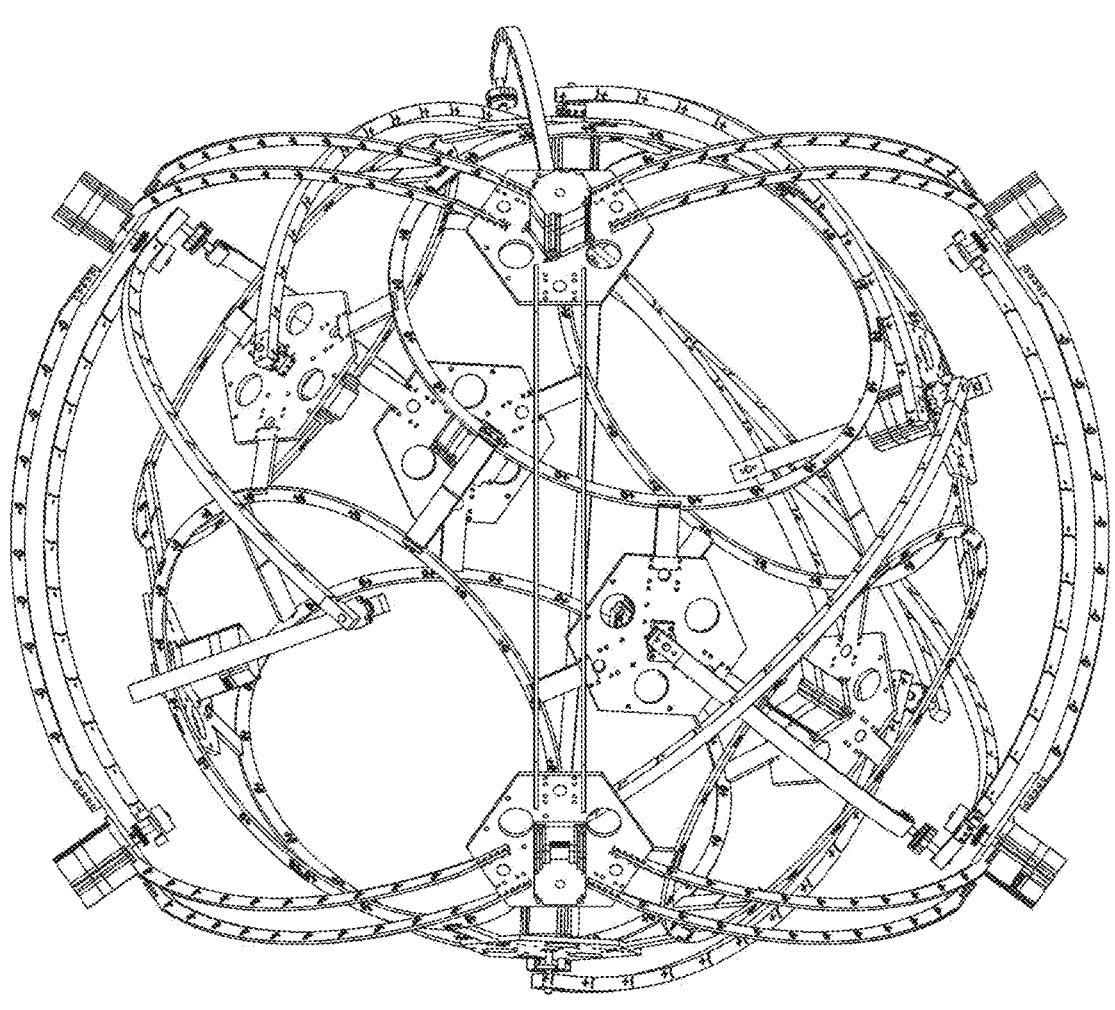
FIG. 5G: Front-view drawing for the 2nd embodiment of frame type I and frame type V
Figure 5H:
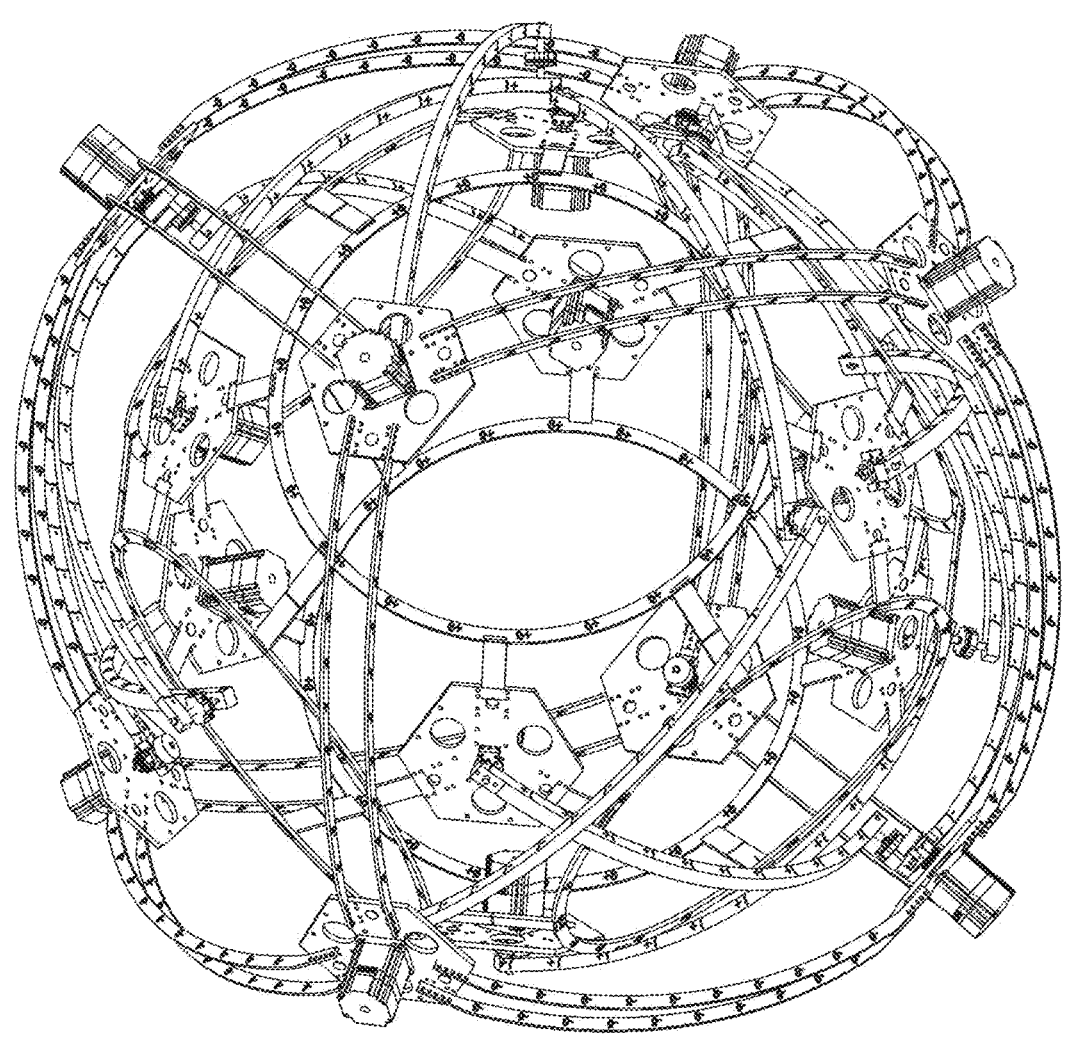
FIG. 5H: 3-view drawing for the 2nd embodiment of frame type I and frame type V
Figure 6A:
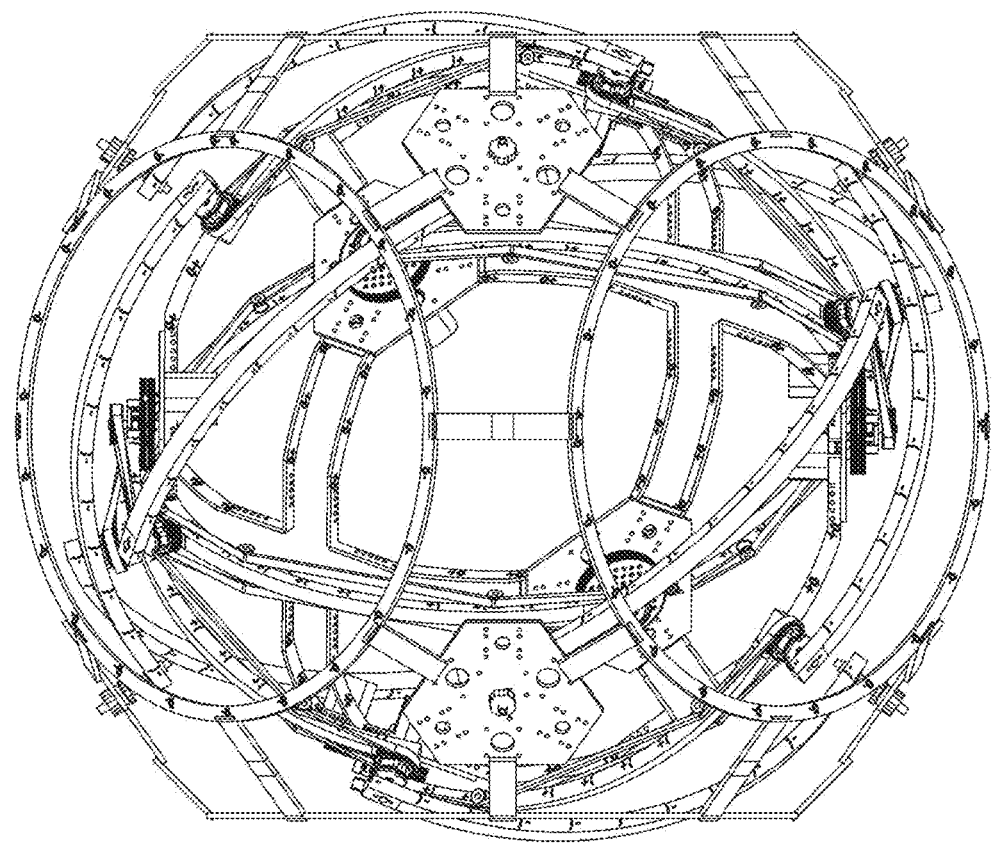
FIG. 6A: Front-view drawing for the 3rd embodiment of frame type II and frame type VI
Figure 6B:
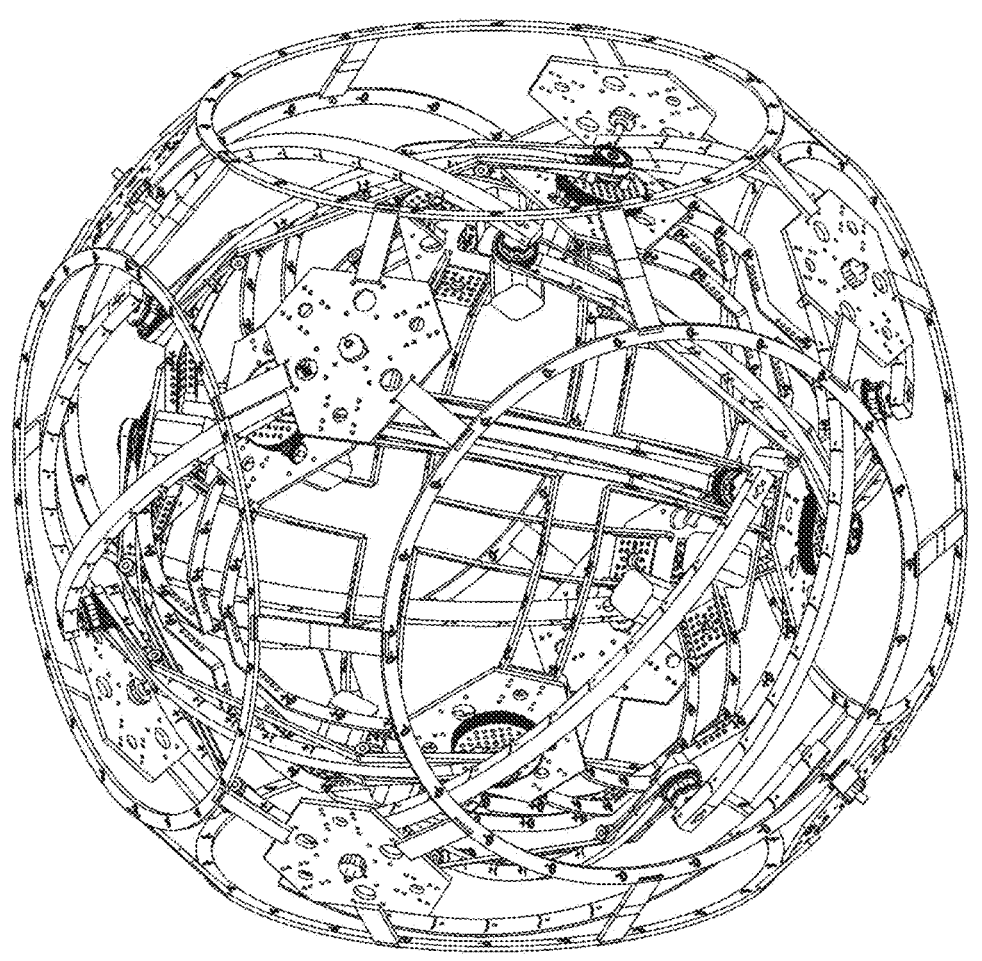
FIG. 6B: 3-view drawing for the 3rd embodiment of frame type II and frame type VI
Figure 6C:
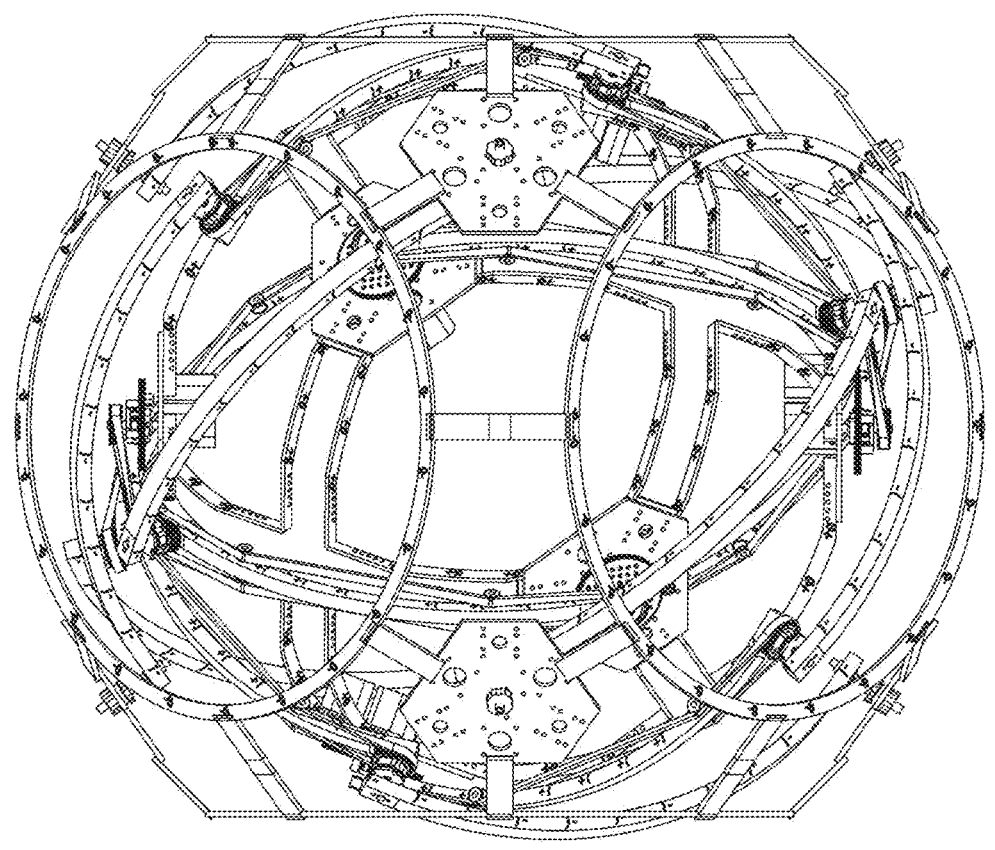
FIG. 6C: Front-view drawing for the 3rd embodiment of frame type II and frame type VI
Figure 6D:
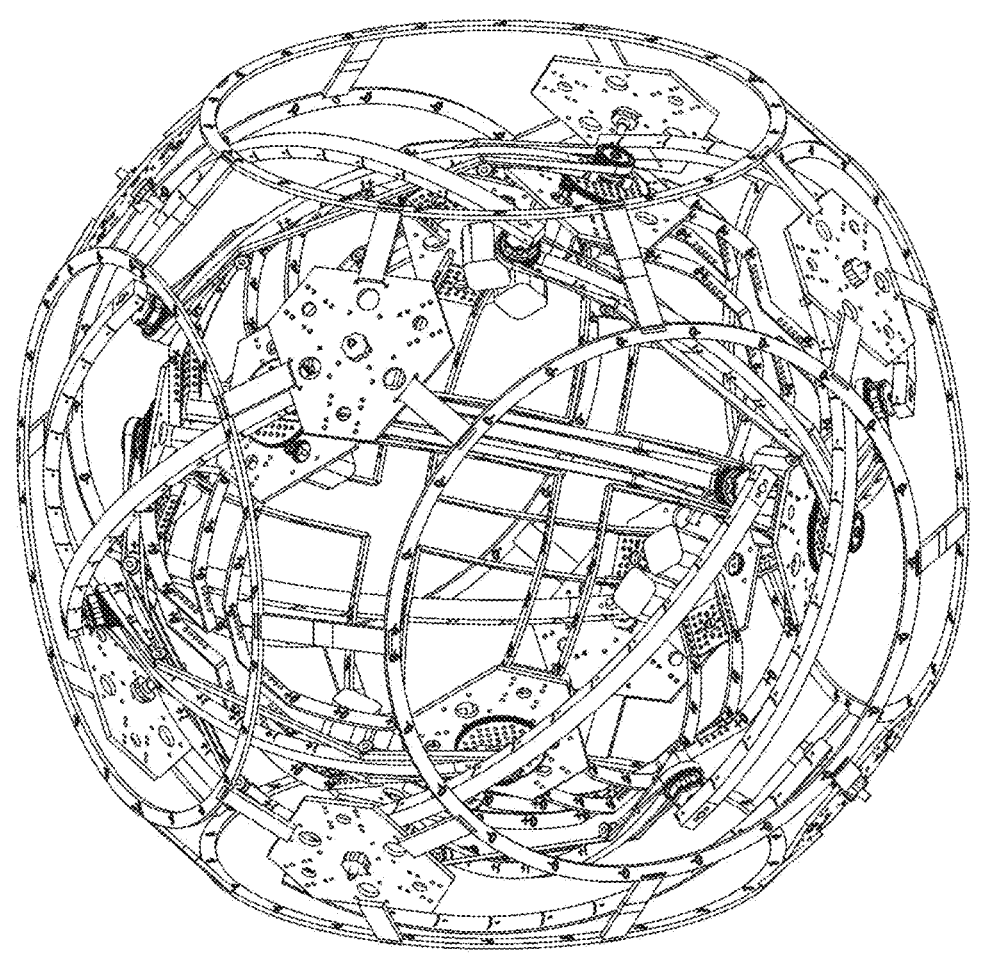
FIG. 6D: 3-view drawing for the 3rd embodiment of frame type II and frame type VI
Figure 6E:
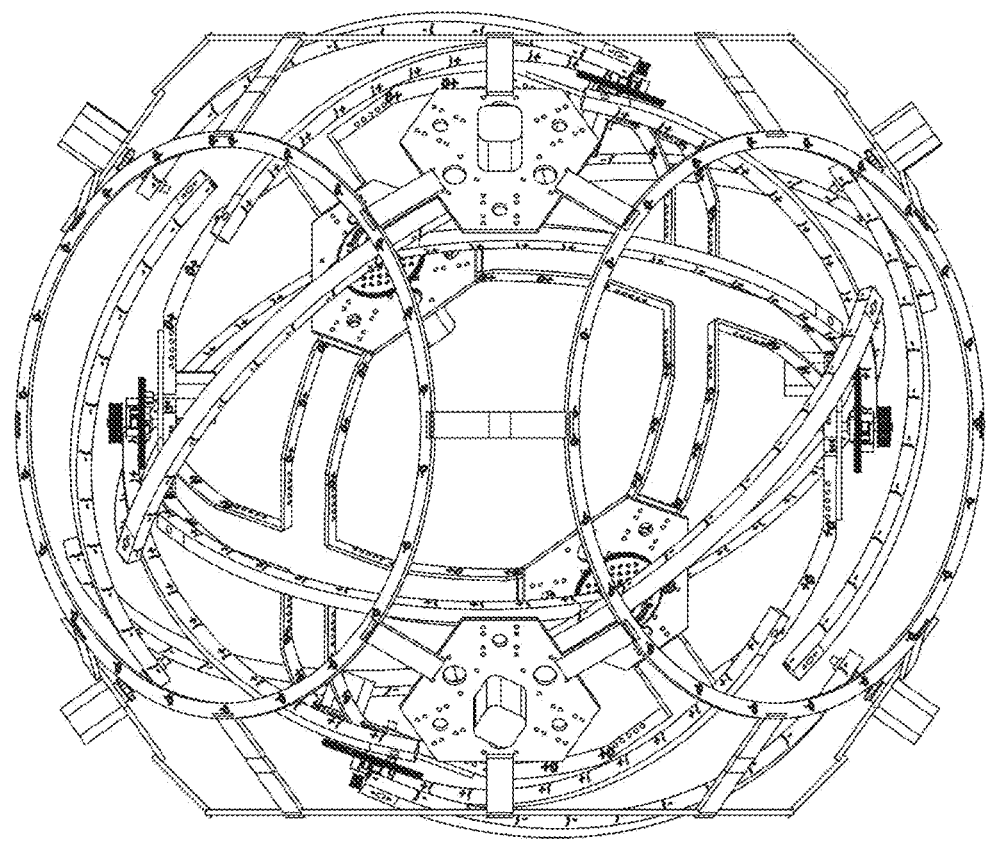
FIG. 6E: Front-view drawing for the 4th embodiment of frame type II and frame type VI
Figure 6F:
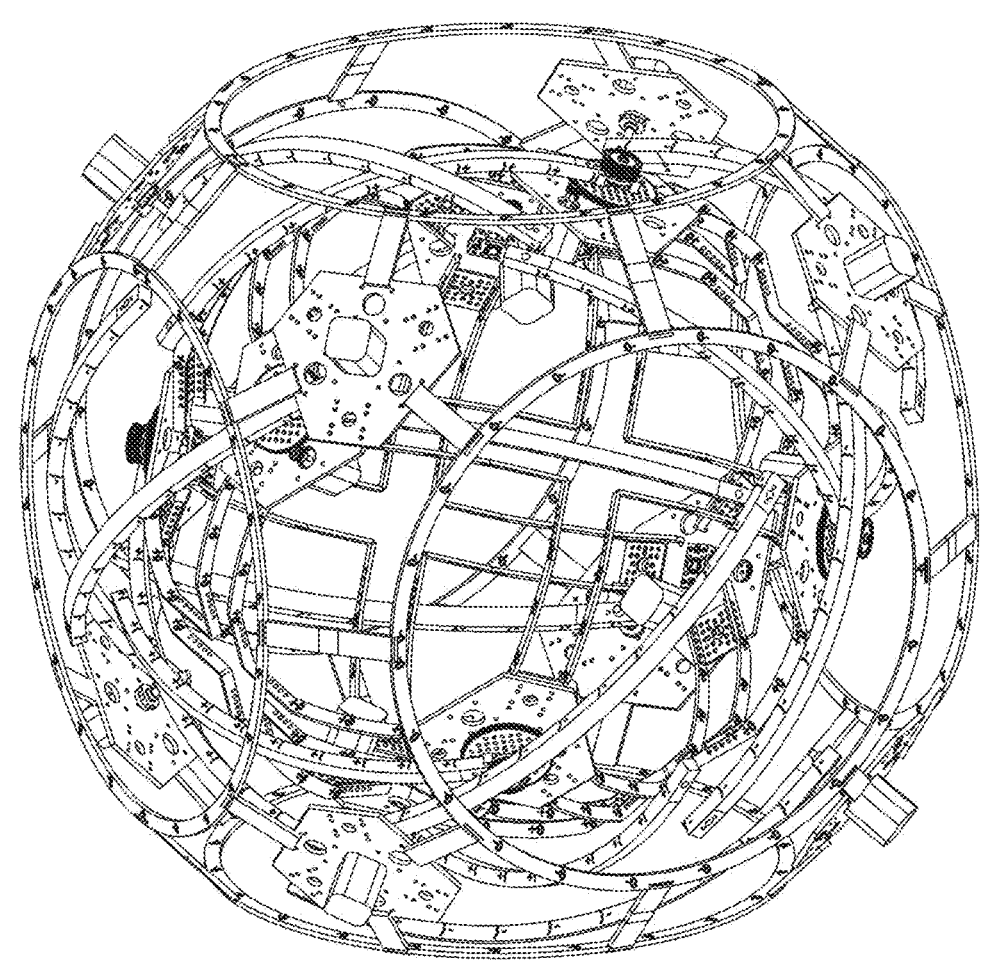
FIG. 6F: 3-view drawing for the 4th embodiment of frame type II and frame type VI
Figure 6G:
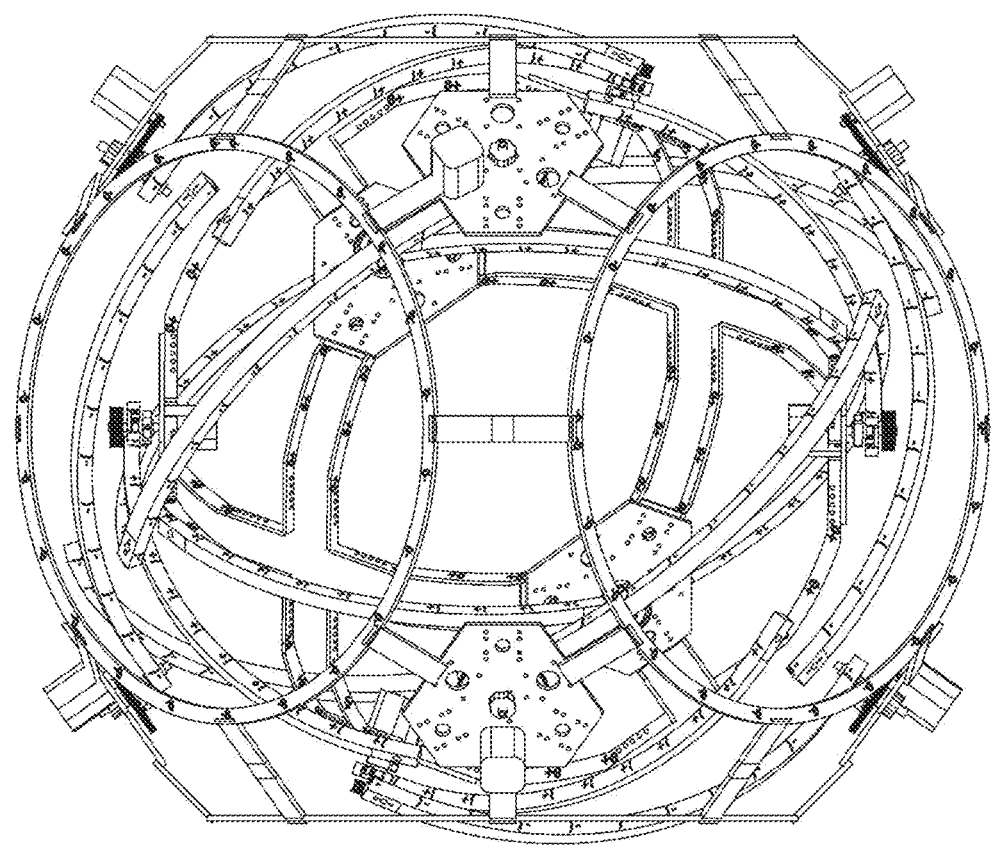
FIG. 6G: Front-view drawing for the 4th embodiment of frame type II and frame type VI
Figure 6H:
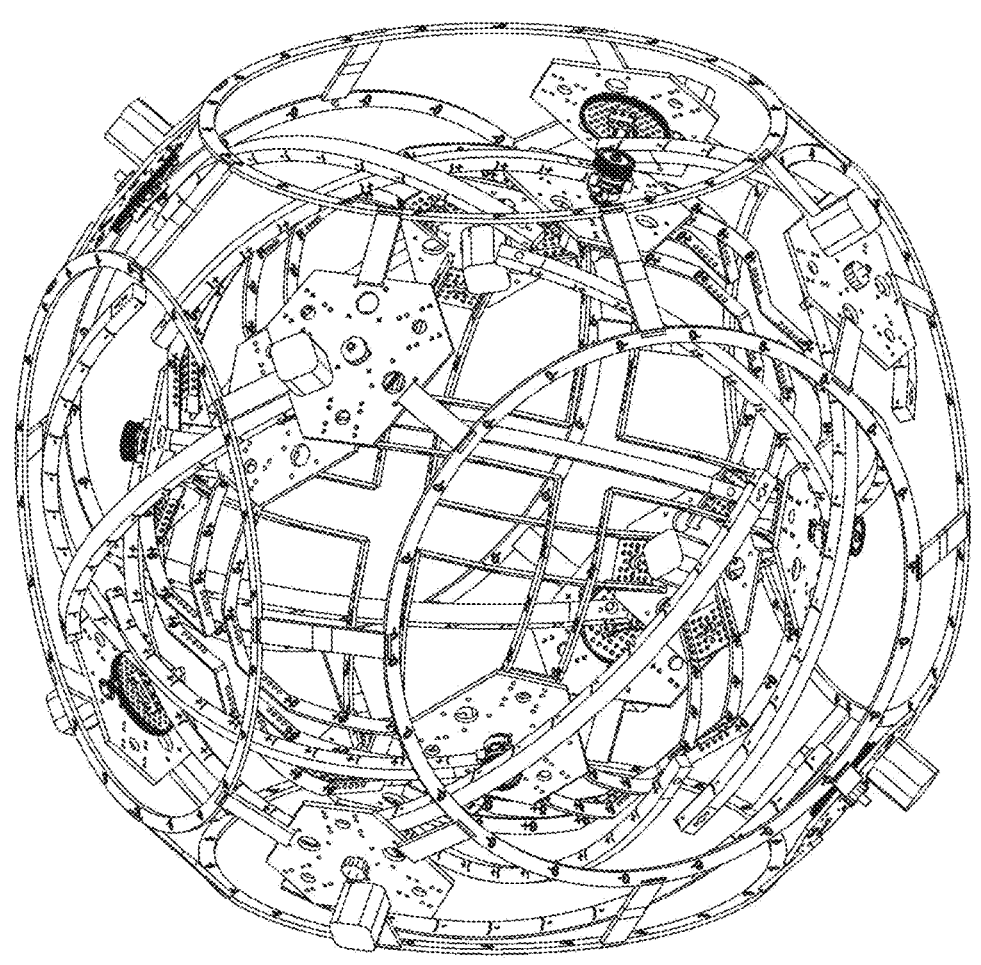
FIG. 6H: 3-view drawing for the 4th embodiment of frame type II and frame type VI This disclosure mechanism is respectively designated into two categories of symbols for U-vectoring Config. and V-vectoring Config.

The fourth independent claim according to the V-vectoring Config. "excludes" eight transmit sets, shown as FIGS. 4C and 4D.

U-frame set and V-frame set can be separately designed by six different frame types. Therefore, at least four embodiments can be introduced.

The 1st embodiment is the first independent claim frame type I and frame type V, shown as FIG. 5A, FIG. 5B, FIG. 5C and FIG. 5D.

The 2nd embodiment is the second independent claim frame type I and frame type V, shown as FIG. 5E, FIG. 5F, FIG. 5G and FIG. 5H.

The 3rd embodiment is the third independent claim frame type II and frame type VI, shown as FIG. 6A, FIG. 6B, FIG. 6C and FIG. 6D.

The 4th embodiment is the fourth independent claim frame type II and frame type VI, shown as FIG. 6E, FIG. 6F, FIG. 6G and FIG. 6H.

Those skilled in this disclosure will readily observe that numerous modifications and alterations of the device and method may be made while retaining the teachings of the mechanism. Accordingly, the above disclosure should be construed as limited only by the metes and bounds of the appended claims.

What is claimed is:

1. A mechanism geometrically constituted by twenty-four concentric axes is manipulated for spherical coordinate kinematics, including:

a U-frame set comprising a U-frame and eight U-plates, the U-frame including a plurality of brackets and being geometrically defined by eight U-octahedron faces, each U-octahedron face being normal onto a U-normal vector which is converged at a center of the U-frame, wherein an angle between any two U-normal vectors is greater than 60° and less than 120°, the eight U-plates which are respectively normal onto the eight U-normal vectors being mounted with the U-frame to construct the U-frame set;

a V-frame set comprising a V-frame and eight V-plates, the V-frame including a plurality of brackets and being geometrically defined by eight V-octahedron faces, each V-octahedron face being normal onto a V-normal vector which is converged at a center of the V-frame, wherein an angle between any two V-normal vectors is greater than 60° and less than 120°, the eight V-plates which are respectively normal onto the eight V-normal vectors being mounted with the V-frame to construct the V-frame set;

eight U-arc-link sets, each U-arc-link set comprising a U-axle pair, at least one U-drive-gear pair, at least one U-drive-module, a U-slave-gear pair and a U-arc-link, each U-axle pair including a U-bearing and a U-axle, the U-bearing being mounted onto a corresponding U-plate, both ends of the U-axle being a frame-end and link-end, wherein the U-axle through the U-bearing coincides with a respective U-normal vector of the U-plate and points into a center of the U-frame set, each U-drive-gear pair including a U-drive-bearing and a U-drive-gear, the U-drive-bearing being mounted onto the corresponding U-plate, a shaft of the U-drive-module through the U-drive-bearing being pivotally fastened onto the U-drive-gear, each U-slave-gear pair including a U-slave-bearing and a U-slave-gear, the U-slave-bearing being mounted onto the U-slave-gear, the U-axle through the U-gear bearing being pivotally fastened with the U-slave-gear, the U-slave-gear meshed with the U-drive-gear and being synchronously rotated by the U-drive-module, wherein a distance between both centers of the U-drive-gear and the U-slave-gear is equal to a sum of reference radii of the U-drive-gear and U-slave-gear, both ends of the U-arc-link being a frame-end and link-end, the frame-end of the U-arc-link being pivotally fastened onto the U-slave-gear;

eight V-arc-link sets, each V-arc-link set comprising a V-axle pair, a W-axle pair, a W-rotate-module and a V-arc-link, each V-axle pair including a V-bearing and a V-axle, the V-bearing being mounted onto a corresponding V-plate, both ends of the V-axle being a frame-end and link-end, wherein the V-axle through the V-bearing coincides with a respective V-normal vector of the V-plate and points into a center of the V-frame set, each W-axle pair including a W-bearing and a W-axle, the W-bearing being mounted onto the link-end of a respective U-arc-link, both ends of the W-axle being a U-end and V-end, the W-axle being directed through the W-bearing, the V-end of the W-axle being pivotally fastened onto the link-end of the V-arc-link, a shaft of the W-rotate-module being pivotally fastened onto the U-end of the W-axle, both ends of the V-arc-link being a frame-end and a link-end, the frame-end of the V-arc-link being pivotally fastened onto the link-end of the V-axle;

and eight transmit sets, each transmit set comprising at least one W-drive-gear pair, at least one W-drivemodule, a W-slave-gear pair and a conveyor set, each W-drive-gear pair including a W-drive-bearing and a W-drive-gear, the W-drive-bearing being mounted onto the corresponding U-plate, a shaft of the W-drive-module through the W-drive-bearing being pivotally fastened onto the W-drive-gear, each W-slave-gear pair including a W-slave-bearing and a W-slave-gear, the W-slave-bearing through the U-axle being mounted onto the W-slave-gear, the W-slave-gear being inserted between the U-slave-gear and the corresponding U-plate, the W-slave-gear meshed with the W-drive-gear and being synchronously rotated by the W-drive-module, wherein a distance between both centers of the W-drive-gear and the W-slave-gear is equal to a sum of reference radii of the W-drive-gear and the W-slave-gear, each conveyor set including a W-drive-pulley, a W-slave-pulley, a W-convey-belt and at least one pair of W-idlers, the W-drive-pulley being pivotally fastened onto the link-end of a respective U-axle, the W-slave-pulley being pivotally fastened onto the V-end of a respective W-axle, both sides of the W-convey-belt being synchronously meshed and conveyed with the W-drive-pulley and the W-slave-pulley, each pair of W-idlers being respectively installed onto both sides and rolled within an outer flange of a respective U-arc-link.

2. The mechanism according to claim 1, wherein each U-drive-module is one of a motor or a torque output device or an angle sensor or a shaft, wherein each W-drive-module is one of a motor or a torque output device or an angle sensor or a shaft, wherein each W-rotate-module is one of an angle sensor or a shaft.

3. The mechanism according to claim 1, wherein each W-drive-pulley is one of a timing pulley or a winch pulley or a groove pulley or a sprocket, wherein each W-slave-pulley is one of a timing pulley or a winch pulley or a groove pulley or a sprocket, wherein each W-convey-belt is a timing belt or a round belt or a cable or a chain.

4. A mechanism geometrically constituted by twenty-four concentric axes is manipulated for spherical coordinate kinematics, including:

a U-frame set comprising a U-frame and eight U-plates, the U-frame including a plurality of brackets and being geometrically defined by eight U-octahedron faces, each U-octahedron face being normal onto a U-normal vector which is converged at a center of the U-frame, wherein an angle between any two U-normal vectors is greater than 60° and less than 120°, the eight U-plates which are respectively normal onto the eight U-normal vectors being mounted with the U-frame to construct the U-frame set;

a V-frame set comprising a V-frame and eight V-plates, the V-frame including a plurality of brackets and being geometrically defined by eight V-octahedron faces, each V-octahedron face being normal onto a V-normal vector which is converged at a center of the V-frame, wherein an angle between any two V-normal vectors is greater than 60° and less than 120°, the eight V-plates which are respectively normal onto the eight V-normal vectors being mounted with the V-frame to construct the V-frame set;

eight U-arc-link sets, each U-arc-link set comprising a U-axle pair, at least one U-drive-gear pair, at least one U-drive-module, a U-slave-gear pair and a U-arc-link, each U-axle pair including a U-bearing and a U-axle, the U-bearing being mounted onto a corresponding U-plate, both ends of the U-axle being a frame-end and link-end, wherein the U-axle through the U-bearing coincides with a respective U-normal vector of the U-plate and points into a center of the U-frame set, each U-drive-gear pair including a U-drive-bearing and a U-drive-gear, the U-drive-bearing being mounted onto the corresponding U-plate, a shaft of the U-drive-module through the U-drive-bearing being pivotally fastened onto the U-drive-gear, each U-slave-gear pair including a U-slave-bearing and a U-slave-gear, the U-slave-bearing being mounted onto the U-slave-gear, the U-axle through the U-gear bearing being pivotally fastened with the U-slave-gear, the U-slave-gear meshed with the U-drive-gear and being synchronously rotated by the U-drive-module, wherein a distance between both centers of the U-drive-gear and the U-slave-gear is equal to a sum of reference radii of the U-drive-gear and U-slave-gear, both ends of the U-arc-link being a frame-end and link-end, the frame-end of the U-arc-link being pivotally fastened onto the U-slave-gear;

and eight V-arc-link sets, each V-arc-link set comprising a V-axle pair, a W-axle pair, a W-rotate-module and a V-arc-link, each V-axle pair including a V-bearing and a V-axle, the V-bearing being mounted onto a corresponding V-plate, both ends of the V-axle being a frame-end and link-end, wherein the V-axle through the V-bearing coincides with a respective V-normal vector of the V-plate and points into a center of the V-frame set, each W-axle pair including a W-bearing and a W-axle, the W-bearing being mounted onto the link-end of a respective U-arc-link, both ends of the W-axle being a U-end and V-end, the W-axle being directed through the W-bearing, the V-end of the W-axle being pivotally fastened onto the link-end of the V-arc-link, a shaft of the W-rotate-module being pivotally fastened onto the U-end of the W-axle, both ends of the V-arc-link being a frame-end and a link-end, the frame-end of the V-arc-link being pivotally fastened onto the link-end of the V-axle.

5. The mechanism according to claim 4, wherein each U-drive-module is one of a motor or a torque output device or an angle sensor or a shaft, wherein each W-drive-module is one of a motor or a torque output device or an angle sensor or a shaft, wherein each W-rotate-module is one of an angle sensor or a shaft.

* * * * *